US010727979B2

(12) United States Patent
Um et al.

(10) Patent No.: US 10,727,979 B2
(45) Date of Patent: Jul. 28, 2020

(54) OPERATION METHODS OF COMMUNICATION NODE IN NETWORK SUPPORTING LICENSED AND UNLICENSED BANDS

(71) Applicant: Electronics and Telecommunications Research Institute, Daejeon (KR)

(72) Inventors: Jung Sun Um, Daejeon (KR); Hoi Yoon Jung, Daejeon (KR); Sung Jin Yoo, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 69 days.

(21) Appl. No.: 15/234,121

(22) Filed: Aug. 11, 2016

(65) Prior Publication Data
US 2017/0048828 A1 Feb. 16, 2017

(30) Foreign Application Priority Data

Aug. 14, 2015 (KR) ......... 10-2015-0114976
Nov. 6, 2015 (KR) ......... 10-2015-0156080
Nov. 23, 2015 (KR) ......... 10-2015-0164099
Aug. 5, 2016 (KR) ......... 10-2016-0100177

(51) Int. Cl.
*H04W 72/04* (2009.01)
*H04L 1/00* (2006.01)
*H04L 5/00* (2006.01)
*H04L 1/18* (2006.01)

(52) U.S. Cl.
CPC .......... *H04L 1/0061* (2013.01); *H04L 1/1822* (2013.01); *H04L 1/1854* (2013.01); *H04L 1/1896* (2013.01); *H04L 5/0053* (2013.01); *H04L 5/0092* (2013.01); *H04L 2001/0093* (2013.01)

(58) Field of Classification Search
CPC ... H04L 1/0061; H04L 5/0073; H04L 5/0053; H04L 5/0092; H04W 72/04
USPC ...................................................... 370/329
See application file for complete search history.

(56) References Cited

U.S. PATENT DOCUMENTS

| | | | |
|---|---|---|---|
| 2005/0143123 A1* | 6/2005 | Black | H04B 1/713 |
| | | | 455/552.1 |
| 2009/0298493 A1* | 12/2009 | Lin | H04W 72/042 |
| | | | 455/432.1 |
| 2015/0023315 A1 | 1/2015 | Yerramalli et al. | |
| 2015/0031382 A1 | 1/2015 | Damnjanovic et al. | |
| 2015/0063098 A1 | 3/2015 | Yavuz et al. | |
| 2015/0092703 A1 | 4/2015 | Xu et al. | |
| 2015/0098437 A1 | 4/2015 | Chen et al. | |

(Continued)

*Primary Examiner* — Jae Y Lee
*Assistant Examiner* — Jean F Voltaire
(74) *Attorney, Agent, or Firm* — William Park & Associates Ltd.

(57) ABSTRACT

Disclosed are operation methods of a communication node in a network supporting licensed and unlicensed bands. An operation method of a user equipment (UE) may comprises receiving, from a base station, a physical downlink control channel (PDCCH) including downlink control information (DCI) in a subframe n−1 of an unlicensed band; decoding the DCI using a common radio network temporary identifier (RNTI); and identifying the number of symbols of the subframe n−1 or a subframe n based on the decoded DCI. Therefore, a performance of the network can be enhanced.

13 Claims, 18 Drawing Sheets

(56) References Cited

U.S. PATENT DOCUMENTS

| | | |
|---|---|---|
| 2015/0110012 A1 | 4/2015 | Bhushan et al. |
| 2015/0146645 A1 | 5/2015 | Sergeyev et al. |
| 2015/0201431 A1 | 7/2015 | Um et al. |
| 2015/0382234 A1 | 12/2015 | Yoo et al. |
| 2016/0050667 A1* | 2/2016 | Papasakellariou .... H04L 5/0053 370/329 |
| 2016/0135143 A1* | 5/2016 | Won ................ H04W 72/005 370/312 |
| 2016/0302180 A1* | 10/2016 | Nory ................. H04L 5/0096 |
| 2017/0034817 A1* | 2/2017 | Park ..................... H04L 5/001 |
| 2018/0205534 A1* | 7/2018 | Yi ...................... H04L 5/1469 |
| 2018/0279264 A1* | 9/2018 | Shimezawa ........... H04W 16/14 |
| 2019/0261288 A1* | 8/2019 | Loehr ................. H04W 24/08 |

* cited by examiner

OPERATION METHODS OF COMMUNICATION NODE IN NETWORK SUPPORTING LICENSED AND UNLICENSED BANDS

CROSS-REFERENCE TO RELATED APPLICATIONS

This application claims the benefit of and priority to Korean Patent Application No. 10-2015-0114976 filed on Aug. 14, 2015, Korean Patent Application No. 10-2015-0156080 filed on Nov. 6, 2015, Korean Patent Application No. 10-2015-0164099 filed on Nov. 23, 2015, and Korean Patent Application No. 10-2016-0100177 filed on Aug. 5, 2016 in the Korean Intellectual Property Office (KIPO), the entire contents of which are hereby incorporated by reference.

BACKGROUND

1. Technical Field

The present disclosure relates to communication technologies supporting licensed and unlicensed bands, and more particularly, to operation methods of a communication node supporting a licensed assisted access (LAA).

2. Related Art

Various wireless communication technologies are being developed in accordance with advancement of information communication technologies. Wireless communication technologies may be generally classified into technologies using licensed bands and technologies using unlicensed bands (e.g., industrial-scientific-medical (ISM) band) according to bands used by respective technologies. Since a licensed band is exclusively used by a specific operator, the technology using the licensed band may provide better reliability, communication quality, etc. than that using an unlicensed band.

There exists, as a representative cellular communication technology using the licensed band, a Long Term Evolution (LTE) or LTE-Advanced standardized in a $3^{rd}$ generation partnership project (3GPP). Thus, a base station or a user equipment (UE) supporting LTE or LTE-Advanced may transmit or receive signals through the licensed band. Also, there exists, as a representative wireless communication technology using the unlicensed band, a wireless local area network (WLAN) defined in IEEE 802.11. Thus, an access point or a station supporting the WLAN may transmit or receive signals through the unlicensed band.

Meanwhile, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining the additional licensed bands. In order to resolve the above-described problem, a method for providing LTE or LTE-Advanced services through the unlicensed band may be considered.

In the case that LTE or LTE-Advanced services are provided through the unlicensed band, unnecessary information may be transmitted to a communication node which does not configure an unlicensed band cell. Also, due to characteristics of the unlicensed band (e.g., an opportunistic channel access manner, limitation of a maximum transmission duration (or, maximum channel occupancy time), etc.), a subframe structure, a scheduling method, and so on defined for the licensed band may not be used in the unlicensed band.

Meanwhile, this description on the related arts is written for understanding of the background of the present disclosure. Thus, information on other than conventional technologies, which are already known to those skilled in this technology domain to which the technologies of the present disclosure belong, may be included in this description.

SUMMARY

Accordingly, embodiments of the present disclosure are provided to substantially obviate one or more problems due to limitations and disadvantages of the related art. The embodiments of the present disclosure provide methods for transmitting control information using a radio network temporary identifier (RNTI) for an unlicensed band.

In accordance with the embodiments of the present disclosure, an operation method of a user equipment (UE) in a communication network may be provided. The method may comprise receiving, from a base station, a physical downlink control channel (PDCCH) including downlink control information (DCI) in a subframe n−1 of an unlicensed band; decoding the DCI using a common radio network temporary identifier (RNTI); and identifying the number of symbols of a subframe n of the unlicensed band based on the decoded DCI.

The common RNTI may be obtained from the base station based on a radio resource control (RRC) signaling.

Here, a cyclic redundancy check (CRC) of the DCI may be scrambled based on the common RNTI.

Here, a length of the subframe n−1 may be 1 millisecond and the subframe n may be a partial subframe whose length is less than 1 millisecond.

Here, when consecutive subframes are received from the base station, the subframe n may be a start subframe of the consecutive subframes.

Here, when consecutive subframes are received from the base station, the subframe n may be an end subframe of the consecutive subframes.

Also, the method may further comprise identifying to whether the subframe n is a partial subframe whose length is less than 1 millisecond based on the decoded DCI.

Furthermore, in accordance with the embodiments of the present disclosure, an operation method of a base station in a communication network may be provided. The method may comprise generating downlink control information (DCI) including information which indicates the number of symbols of a subframe n of an unlicensed band; scrambling a cyclic redundancy check (CRC) of the DCI using a common radio network temporary identifier (RNTI); and transmitting a physical downlink control channel (PDCCH) including the scrambled DCI to a user equipment (UE) in a subframe n−1 of the unlicensed band.

The common RNTI may be transmitted to the UE based on a radio resource control (RRC) signaling.

Here, a length of the subframe n−1 may be 1 millisecond and the subframe n may be a partial subframe whose length is less than 1 millisecond.

Here, when consecutive subframes are transmitted to the UE, the subframe n may be a start subframe of the consecutive subframes.

Here, when consecutive subframes are transmitted to the UE, the subframe n may be an end subframe of the consecutive subframes.

Also, the DCI may further include information indicating to whether the subframe n is a partial subframe whose length is less than 1 millisecond.

Furthermore, in accordance with the embodiments of the present disclosure, a user equipment (UE) supporting an unlicensed band may be provided. The UE may comprise a processor; and a memory storing at least one command which is executed by the processor, wherein the at least one command may be executed to receive, from a base station, a physical downlink control channel (PDCCH) including downlink control information (DCI) in a subframe n−1 of the unlicensed band, decode the DCI using a common radio network temporary identifier (RNTI), and identify the number of symbols of a subframe n of the unlicensed band based on the decoded DCI.

The common RNTI may be obtained from the base station based on a radio resource control (RRC) signaling.

Here, a cyclic redundancy check (CRC) of the DCI may be scrambled based on the common RNTI.

Here, a length of the subframe n−1 may be 1 millisecond and the subframe n may be a partial subframe whose length is less than 1 millisecond.

Here, when consecutive subframes are received from the base station, the subframe n may be a start subframe of the consecutive subframes.

Here, when consecutive subframes are received from the base station, the subframe n may be an end subframe of the consecutive subframes.

Also, the at least one command may be further executed to identify to whether the subframe n is a partial subframe whose length is less than 1 millisecond based on the decoded DCI.

According to the embodiments of the present disclosure, a RNTI for the unlicensed band can be defined. Based on the RNTI for the unlicensed band, information of subframe structure (e.g., information related to a partial subframe), scheduling information, activation request information of an unlicensed band cell, deactivation request information of the unlicensed band cell, and so on can be transmitted. The UE can obtain necessary information using the RNTI for the unlicensed band. Therefore, the unlicensed band cell can be effectively operated, and a performance of the communication network can be enhanced.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION OF THE EMBODIMENTS

Figure 1:
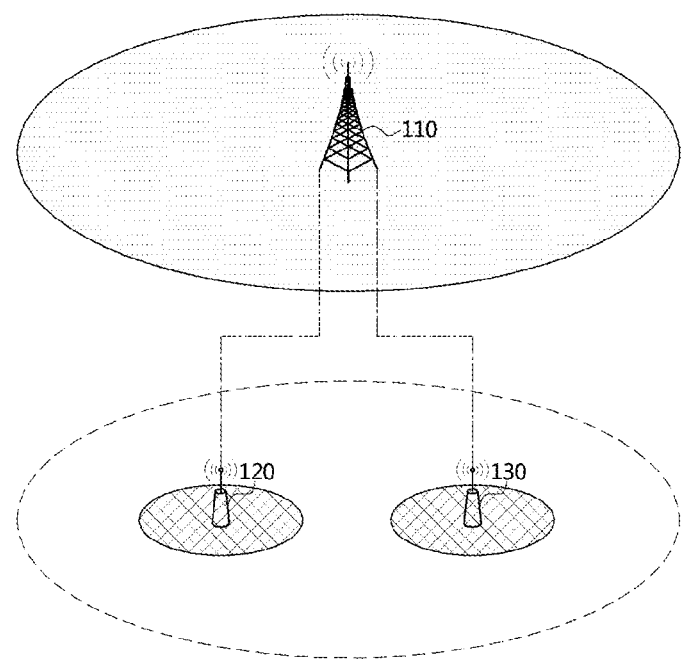
FIG. 1 is a conceptual diagram illustrating a first embodiment of a wireless communication network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which embodiments according to the present disclosure will be described. However, the wireless communication networks to which embodiments according to the present disclosure are applied are not restricted to what will be described below. That is, embodiments according to the present disclosure may be applied to various wireless communication networks.

FIG. 1 is a conceptual diagram illustrating a first embodiment of a wireless communication network.

Referring to FIG. 1, a first base station 110 may support cellular communications (e.g., Long Term Evolution (LTE), LTE-Advanced (LTE-A), Licensed Assisted Access (LAA), etc. standardized in a $3^{rd}$ Generation Partnership Project (3GPP)). The first base station 110 may support technologies such as a Multiple Input Multiple Output (MIMO) (e.g., Single-User (SU)—MIMO, Multi-User (MU)—MIMO, massive MIMO, etc.), a Coordinated multi-point transmission/reception (CoMP), a Carrier Aggregation (CA), etc. The first base station 110 may operate in a licensed band (F1), and form a macro cell. The first base station 100 may be connected to other base stations (e.g., a second base station 120, a third base station 130, etc.) through ideal backhaul links or non-ideal backhaul links.

The second base station 120 may be located in coverage of the first base station 110. Also, the second base station 120 may operate in an unlicensed band (F3), and form a small cell. The third base station 130 may also be located in coverage of the first base station 110. The third base station 130 may operate in the unlicensed band (F3), and form a small cell. Each of the second base station 120 and the third base station 130 may support a Wireless Local Area Network (WLAN) standardized in an Institute of Electrical and Electronics Engineers (IEEE) 802.11. Each user equipment (UE) connected to the first base station 110 may transmit and receive signals through a CA using the licensed band (F1) and the unlicensed band (F3).

Figure 2:
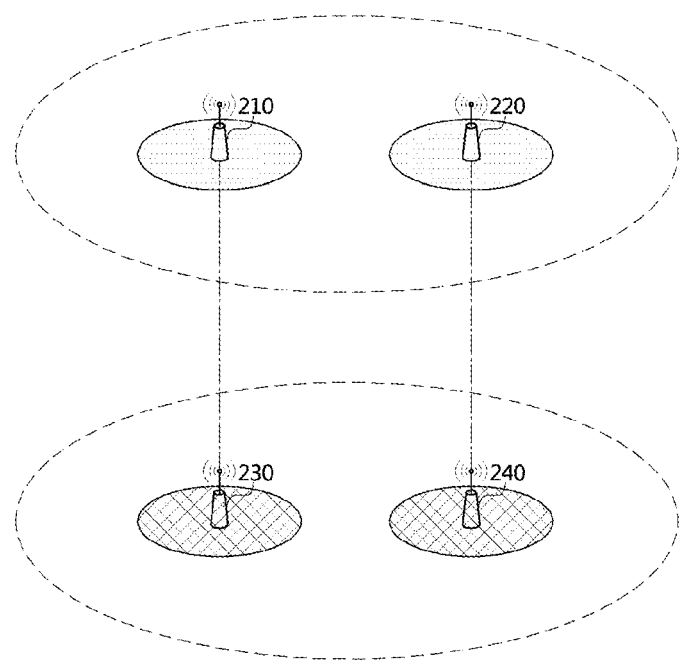
FIG. 2 is a conceptual diagram illustrating a second embodiment of a wireless communication network.

FIG. 2 is a conceptual diagram illustrating a second embodiment of a wireless communication network.

Referring to FIG. 2, each of a first base station 210 and a second base station 220 may support cellular communications (e.g., LTE, LTE-A, LAA, etc.). Each of the first base station 210 and the second base station 220 may support MIMO (e.g., SU-MIMO, MU-MIMO, massive MIMO, etc.), CoMP, CA, etc. Also, each of the base stations 210 and 220 may operate in the licensed band (F1), and form each small cell. Each of the base stations 210 and 220 may be located in coverage of a base station forming a macro cell. The first base station 210 may be connected with a third base station 230 through an ideal backhaul link or a non-ideal backhaul link. Also, the second base station 220 may be connected with a fourth base station 240 through an ideal backhaul link or a non-ideal backhaul link.

The third base station 230 may be located in coverage of the first base station 210. The third base station 230 may operate in the unlicensed band (F3), and form a small cell. The fourth base station 240 may be located in coverage of the second base station 220. The fourth base station 240 may operate in the unlicensed band (F3), and form a small cell. Each of the base stations 230 and 240 may support WLAN standardized in IEEE 802.11. Each of the first base station 210, an UE connected to the first base station 210, the second base station 220, and an UE connected to the second base station 220 may transmit and receive signals through a CA using the licensed band (F1) and the unlicensed band (F3).

Figure 3:
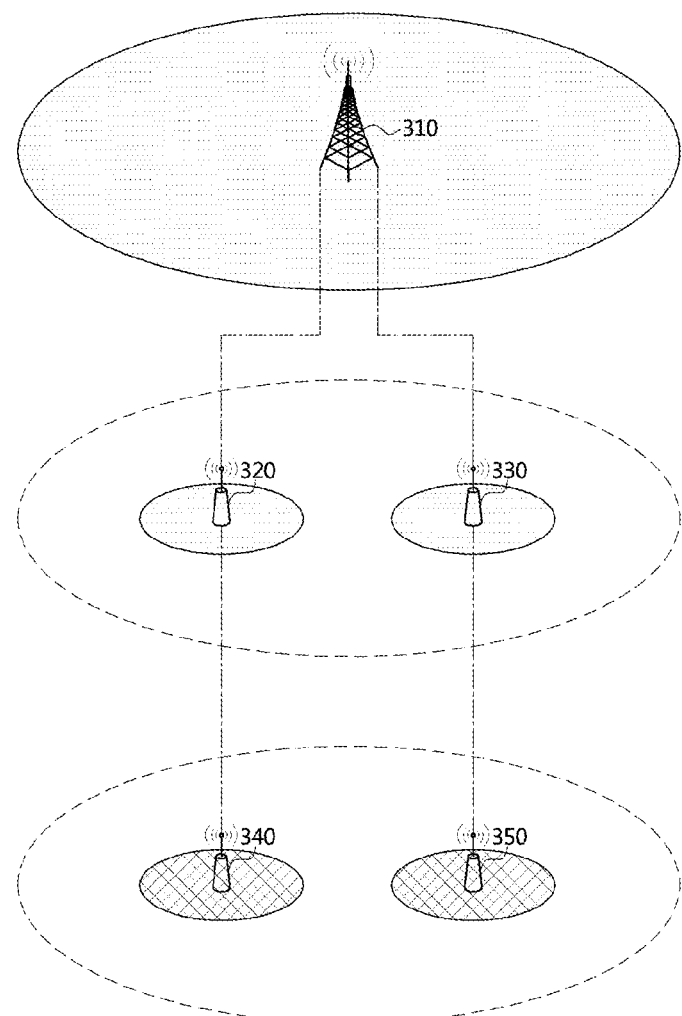
FIG. 3 is a conceptual diagram illustrating a third embodiment of a wireless communication network.

FIG. 3 is a conceptual diagram illustrating a third embodiment of a wireless communication network.

Referring to FIG. 3, each of a first base station 310, a second base station 320, and a third base station 330 may support cellular communications (e.g., LTE, LTE-A, LAA, etc.). Each of the first base station 310, the second base station 320, and the third base station 330 may support MIMO (e.g., SU-MIMO, MU-MIMO, massive MIMO, etc.), CoMP, CA, etc. The first base station 310 may operate in the licensed band (F1), and form a macro cell. The first base station 310 may be connected to other base stations (e.g., the second base station 320, the third base station 330, etc.) through ideal backhaul links or non-ideal backhaul links. The second base station 320 may be located in coverage of the first base station 310. The second base station 320 may operate in the licensed band (F1), and form a small cell. The third base station 330 may be located in coverage of the first base station 310. The third base station 330 may operate in the licensed band (F1), and form a small cell.

The second base station 320 may be connected with a fourth base station 340 through an ideal backhaul link or a non-ideal backhaul link. The fourth base station 340 may be located in coverage of the second base station 320. The fourth base station 340 may operate in the unlicensed band (F3), and form a small cell. The third base station 330 may be connected with a fifth base station 350 through an ideal backhaul link or a non-ideal backhaul link. The fifth base station 350 may be located in coverage of the third base station 330. The fifth base station 350 may operate in the unlicensed band (F3), and form a small cell. Each of the base stations 340 and 350 may support WLAN standardized in IEEE 802.11.

Each of the first base station 310, an UE (not-depicted) connected to the first base station 310, the second base station 320, an UE (not-depicted) connected to the second base station 320, the third base station 330, and an UE (not-depicted) connected to the third base station 330 may transmit and receive signals through a CA using the licensed band (F1) and the unlicensed band (F3).

Figure 4:
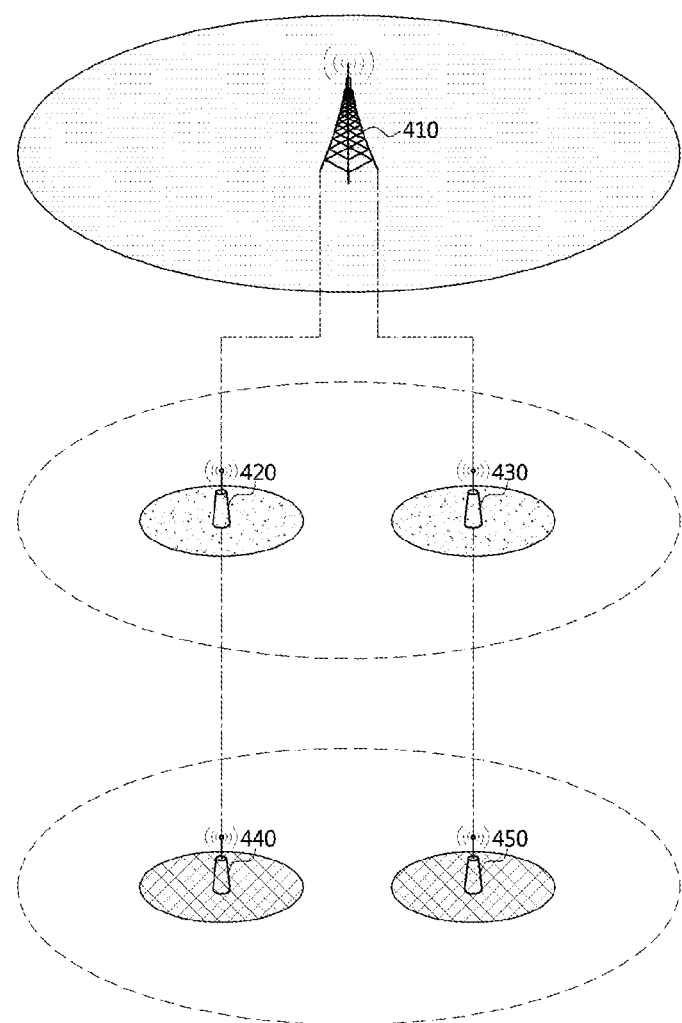
FIG. 4 is a conceptual diagram illustrating a fourth embodiment of a wireless communication network.

FIG. 4 is a conceptual diagram illustrating a fourth embodiment of a wireless communication network.

Referring to FIG. 4, each of a first base station 410, a second base station 420, and a third base station 430 may support cellular communications (e.g., LTE, LTE-A, LAA, etc.). Each of the first base station 410, the second base station 420, and the third base station 430 may support MIMO (e.g., SU-MIMO, MU-MIMO, massive MIMO, etc.), CoMP, CA, etc. The first base station 410 may operate in the licensed band (F1), and form a macro cell. The first base station 410 may be connected to other base stations (e.g., the second base station 420, the third base station 430, etc.) through ideal backhaul links or non-ideal backhaul links. The second base station 420 may be located in coverage of the first base station 410. The second base station 420 may operate in the licensed band (F2), and form a small cell. The third base station 430 may be located in coverage of the first base station 410. The third base station 430 may operate in the licensed band (F2), and form a small cell. Each of the second base station 420 and the third base station 430 may operate in the licensed band (F2) different from the licensed band (F1) in which the first base station 410 operates.

The second base station 420 may be connected with a fourth base station 440 through an ideal backhaul link or a non-ideal backhaul link. The fourth base station 440 may be located in coverage of the second base station 420. The fourth base station 440 may operate in the unlicensed band (F3), and form a small call. The third base station 430 may be connected with a fifth base station 450 through an ideal backhaul link or a non-ideal backhaul link. The fifth base station 450 may be located in coverage of the third base station 430. The fifth base station 450 may operate in the unlicensed band (F3), and form a small cell. Each of the base stations 440 and 450 may support WLAN standardized in IEEE 802.11.

Each of the first base station 410 and an UE (not-depicted) connected to the first base station 410 may transmit and receive signals through a CA using the licensed band (F1) and the unlicensed band (F3). Each of the second base station 420, an UE (not-depicted) connected to the second base station 420, the third base station 430, and an UE (not-depicted) connected to the third base station 430 may transmit and receive signals through a CA using the licensed band (F2) and the unlicensed band (F3).

The above-described communication nodes constituting a wireless communication network (e.g., a base station, an UE, etc.) may transmit signals according to a Listen-Before-Talk (LBT) procedure in the unlicensed band. That is, the communication node may determine whether the unlicensed band is occupied or not by performing an energy detection operation. The communication node may transmit a signal when the unlicensed band is determined as idle state. In this case, the communication node may transmit a signal when the unlicensed band is maintained as idle state during a contention window according to a random backoff operation. On the contrary, when the unlicensed band is determined as a busy state, the communication node may not transmit a signal.

Alternatively, the communication node may transmit a signal based on a Carrier Sensing Adaptive Transmission (CSAT) operation. That is, the communication node may transmit a signal based on a pre-configured duty cycle. The communication node may transmit a signal when a current duty cycle is a duty cycle assigned for communication nodes supporting cellular communications. On the contrary, the communication node may not transmit a signal when a current duty cycle is a duty cycle assigned for communication nodes supporting other communications (e.g., WALN, etc.) except cellular communications. The duty cycle may be determined adaptively based on the number of communication nodes supporting WLAN in the unlicensed band, a usage state of the unlicensed band, etc.

The communication node may perform discontinuous transmission in the unlicensed band. For example, if a maximum transmission duration or a maximum channel occupancy time (max COT) is configured for the unlicensed band, the communication node may transmit signals during the maximum transmission duration or the maxim channel occupancy time. In a case that the communication node cannot transmit whole signals during the current maximum transmission duration (or, maximum channel occupancy time), the communication node may transmit the rest of signals in a next maximum transmission duration (or, next maximum channel occupancy time). Also, the communication node may select a carrier having relatively smaller interferences among unlicensed bands, and operate in the selected carrier. Also, in the case that the communication node transmits signals in the unlicensed band, transmission power may be controlled in order to reduce interferences to other communication nodes.

Meanwhile, the communication node may support communication protocols based on code division multiple access (CDMA), wideband CDMA (WCDMA), time division multiple access (TDMA), frequency division multiple access (FDMA), single carrier FDMA (SC-FDMA), orthogonal frequency division multiplexing (OFDM), or orthogonal frequency division multiple access (OFDMA).

A base station among communication nodes may be referred to as a Node-B (NB), an evolved Node-B (eNB), a base transceiver station (BTS), a radio base station, a radio transceiver, an access point (AP), or an access node. Also, a user equipment (UE) among communication nodes may be referred to as a terminal, an access terminal, a mobile terminal, a station, a subscriber station, a portable subscriber station, a mobile station, a node, or a device. The communication node may have a structure which will be described below.

Figure 5:
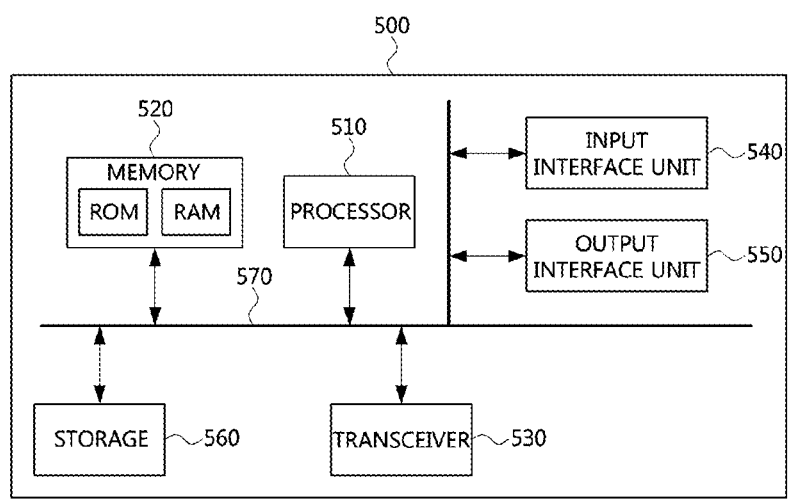
FIG. 5 is a block diagram illustrating an embodiment of a communication node constituting a wireless communication network.

FIG. 5 is a block diagram illustrating an embodiment of a communication node constituting a wireless communication network.

Referring to FIG. 5, a communication node 500 may include at least one processor 510, a memory 520 and a transceiver 530 connected to a network and performing communication. Further, the communication node 500 may include an input interface unit 540, an output interface unit 550, and a storage 560. The respective components included in the communication node 500 may be connected via a bus 570 to communicate with each other.

The processor 510 may perform a program command stored in the memory 520 and/or the storage 560. The processor 510 may be a central processing unit (CPU), a graphics processing unit (GPU) or a dedicated processor in which the methods according to embodiments of the present disclosure are performed. The memory 520 and the storage 560 may include a volatile storage medium and/or a non-volatile storage medium. For example, the memory 520 may include a read only memory (ROM) and/or a random access memory (RAM).

Operation methods of the communication node in the wireless communication network will be described below. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, the carrier aggregation may be applied to at least one of unlicensed band cells and at least one of licensed band cells. Configuration, addition, modification, or release of the unlicensed band cell may be performed through a radio resource control (RRC) signaling (e.g., transmission and reception of "RRCConnectionReconfiguration" messages (hereinafter, referred to as a "RRC message")). The RRC message may be transmitted to a UE through the licensed band cell, and may include information required for management and operation of the unlicensed band cell.

A signaling operation for information used in a setup procedure of an initial unlicensed band cell may be performed in a discovery signal measurement timing configuration (DMTC) period. For adding the unlicensed band cell, a signaling and a procedure for selecting a new unlicensed band cell for the UE may be performed. Operation environments of the unlicensed band may be different from operation environments of the licensed band. In this case, a signaling and a procedure for managing the unlicensed band cell may be performed.

Unlike the licensed band, a period during which signals can be transmitted continuously in the unlicensed band may be restricted within the maximum transmission duration (or, maximum occupation duration). Also, in the case that signals are transmitted based on LBT, signals are transmitted when transmissions of other communication nodes have completed. When LTE (or, LTE-A) services are provided through the unlicensed band, transmission of a communication node supporting LTE or LTE-A services may have non-periodical, non-continuous, and opportunistic characteristics. According to such the characteristics, signals which are continuously transmitted by the communication node supporting LTE or LTE-A services during a predetermined time in an unlicensed band may be referred to as "unlicensed band burst."

Also, a set of consecutive subframes including a combination of one or more channels (e.g., a physical control format indicator channel (PCFICH), a physical hybrid-automatic repeat request (HARQ) indicator channel (PHICH), a physical downlink control channel (PDCCH), a physical downlink shared channel (PDSCH), a physical multicast channel (PMCH), a physical uplink control channel (PUCCH), a physical uplink shared channel (PUSCH), etc.) and signals (e.g., synchronization signals, reference signals, etc.) defined in the licensed band may be transmitted through the unlicensed band. In this case, the transmission of subframes may be referred to as "unlicensed band transmission."

Frames used for transmission in the unlicensed band may be classified into downlink unlicensed band burst frames, uplink unlicensed band burst frames, and downlink/uplink unlicensed band burst frames. The downlink unlicensed band burst frame may include subframes to which the unlicensed band transmission is applied, and further include unlicensed band signals. In the downlink unlicensed band burst frame, the unlicensed band signal may be located before the subframe to which the unlicensed band transmission is applied. The unlicensed band signal may be configured so that timing of the subframe (or, slot, OFDM symbol) to which the unlicensed band transmission is applied coincides with timing of a subframe (or, slot, OFDM symbol) in the licensed band. Also, the unlicensed band signal may be used for automatic gain control (AGC), synchronization acquisition, channel estimation, etc. required for receiving data transmitted based on the unlicensed band transmission.

The subframe to which the unlicensed band transmission is applied may be configured within the maximum transmission duration (or, maximum occupation duration). That is, the number of subframes to which the unlicensed band transmission is applied may be configured according to the maximum transmission duration (or, maximum occupation duration). Here, the number of subframes to which the unlicensed band transmission is applied may be configured in consideration of the unlicensed band signal. Information on the maximum transmission duration (or, maximum occupation duration) may be informed via RRC signaling. The UE may identify a start point of the unlicensed band burst by detecting the PDCCH (or, EPDCCH) or the unlicensed band signal. The actual occupation time of the unlicensed band burst or the subframe to which the unlicensed band transmission is applied may be identified by using the unlicensed band signal or the PHICH.

The unlicensed band signal may include information (or, sequence) indicating the number of subframes (or, time) which is used for the unlicensed band burst or the unlicensed band transmission. Alternatively, the information (or, sequence) indicating the number of subframes (or, time) which is used for the unlicensed band burst or the unlicensed band transmission may be transmitted through the PHICH.

Unlike the licensed band, a transmission of HARQ related information for the uplink may be asynchronously performed. Therefore, redundancy version (RV) information and HARQ process number may be transmitted through the PDCCH (or, EPDCCH) instead of the PHICH. In this case, the PHICH may be used for transmitting other information. For example, the information (or, sequence) indicating the number of subframes (or, time) which is used for the unlicensed band burst or the unlicensed band transmission may be transmitted through the PHICH.

Meanwhile, the cellular communication network (e.g., LTE network) may support frequency division duplexing (FDD) or time division duplexing (TDD). A frame based on FDD may be defined as a type 1 frame, and a frame based on TDD may be defined as a type 2 frame.

Figure 6:
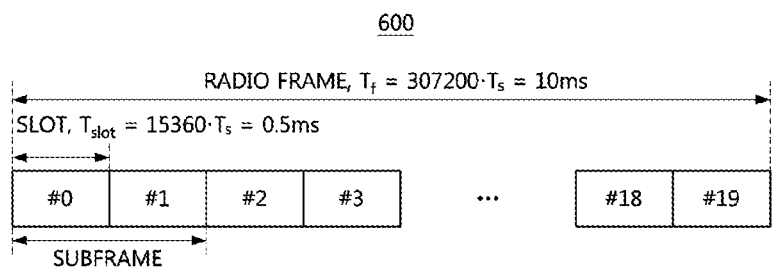
FIG. 6 is a conceptual diagram illustrating an embodiment of a type 1 frame.

FIG. 6 is a conceptual diagram illustrating an embodiment of a type 1 frame.

Referring to FIG. 6, a radio frame 600 may comprise 10 subframes, and each subframe may comprise two slots. Thus, the radio frame 600 may comprise 20 slots (e.g., slot #0, slot #1, slot #2, slot #3, . . . , slot #18, slot #19). The length ($T_f$) of the radio frame 600 may be 10 milliseconds (ms). Also, the length of each subframe may be 1 ms. Also, the length ($T_{slot}$) of each slot may be 0.5 ms. Here, $T_s$ may be 1/30,720,000 second.

Each slot may comprise a plurality of OFDM symbols in time domain, and comprise a plurality of resource blocks (RBs) in frequency domain. Each resource block may comprise a plurality of subcarriers in frequency domain. The number of OFDM symbols constituting each slot may be determined according to configuration of a cyclic prefix (CP). The CP may be classified into a normal CP and an extended CP. If the normal CP is used, each slot may comprise 7 OFDM symbols, and each subframe may comprise 14 OFDM symbols. If the extended CP is used, each slot may comprise 6 OFDM symbols, and each subframe may comprise 12 OFDM symbols.

For example, in a case that the subframe may include 14 OFDM symbols, each number of 14 OFDM symbols included in the subframe may be referred to as OFDM symbol #0, OFDM symbol #1, OFDM symbol #2, OFDM symbol #3, OFDM symbol #4, OFDM symbol #5, OFDM symbol #6, OFDM symbol #7, OFDM symbol #8, OFDM symbol #9, OFDM symbol #10, OFDM symbol #11, OFDM symbol #12, and OFDM symbol #13 in the time domain, sequentially.

Figure 7:
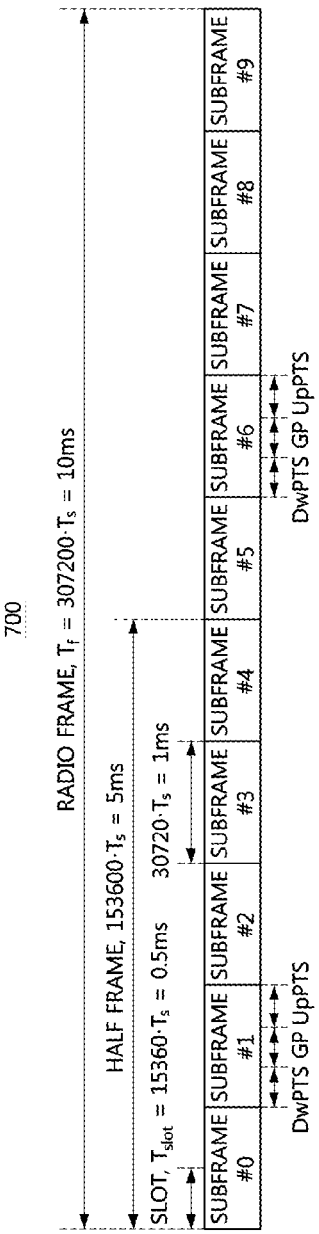
FIG. 7 is a conceptual diagram illustrating an embodiment of a type 2 frame.

FIG. 7 is a conceptual diagram illustrating an embodiment of a type 2 frame.

Referring to FIG. 7, a radio frame 700 may comprise two half frames, and each half frame may comprise 5 subframes. Thus, the radio frame 700 may comprise 10 subframes. The length ($T_f$) of the radio frame 700 may be 10 ms, and the length of each half frame may be 5 ms. The length of each subframe may be 1 ms. Here, $T_s$ may be 1/30,720,000 second.

The radio frame 700 may include at least one downlink subframe, at least one uplink subframe, and at least one special subframe. Each of the downlink subframe and the uplink subframe may comprise two slots. The length ($T_{slot}$) of each slot may be 0.5 ms. Each of subframe #1 and subframe #6, among subframes constituting the radio frame 700, may be a special subframe. Each special subframe may include a downlink pilot time slot (DwPTS), a guard period (GP), and an uplink pilot time slot (UpPTS).

The DwPTS may be regarded as included in downlink duration, and used for cell search, and time and frequency synchronization acquisition of an UE. The GP may be used for resolving interference to uplink data transmission which may occur due to delay of downlink data reception. Also, the GP may include a time required for switching between downlink data reception operation to uplink data transmission operation. The UpPTS may be used for uplink channel estimation, and time and frequency synchronization acquisition of an UE, etc.

The lengths of the DwPTS, GP, and UpPTS included in the special subframe may be controlled variably as needed. Also, the numbers and positions of the downlink subframes, uplink subframes, and special subframes, included in the radio frame 700, may vary as needed.

Figure 8:
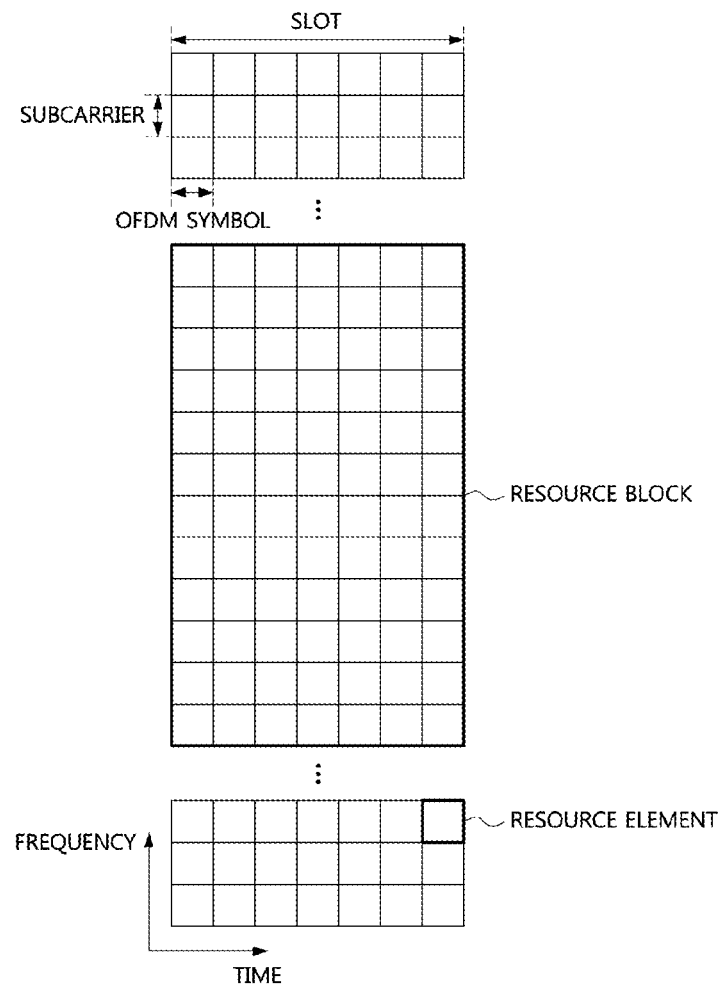
FIG. 8 is a conceptual diagram illustrating an embodiment of a resource grid of a slot included in a subframe.

FIG. 8 is a conceptual diagram illustrating an embodiment of a resource grid of a slot included in a subframe.

Referring to FIG. 8, when the normal CP is used, each resource block (RB) of a slot included in a downlink subframe or an uplink subframe may comprise 7 OFDM symbols in time domain, and 12 subcarriers in frequency domain. In this case, a resource defined by a single OFDM symbol in time domain and a single subcarrier in frequency domain may be referred to as a resource element (RE).

In downlink transmission of a cellular communication network (e.g., LTE network), allocation of resources for an UE may be performed in unit of RBs, and mapping of reference signals and synchronization signals may be performed in unit of REs.

The control channel may be set in three OFDM symbols (e.g., OFDM symbols #0 to #2) or four OFDM symbols (e.g., OFDM symbols #0 to #3) which are located in forepart of the first slot of the subframe. The control channel may include the PDCCH, the PCFICH, PHICH, etc. The data channel (e.g., PDSCH, and so on) to be used for transmitting data may be basically set in remaining parts, except for the forepart in which the control channel is set, of the subframe. Also, the EPDCCH may be set in some resource blocks (or, resource elements) among the remaining parts.

Information indicating the number of OFDM symbols which are used for the control channel may be transmitted through the PCFICH. The PCFICH may be set in OFDM symbol #0 of the subframe. A response (e.g., HARQ response, etc.) to the uplink (e.g., PUSCH, etc.) transmission may be transmitted through the PHICH. The HARQ response may be acknowledgment (ACK), negative ACK (NACK), discontinuous transmission (DTX), or ANY.

Downlink control information (DCI) may be transmitted through at least one of PDCCH and EPDCCH. Also, the DCI may include at least one of resource allocation information and resource control information for an UE or a specific group of UEs. For example, the DCI may include downlink scheduling information, uplink scheduling information, uplink transmit power control command, etc. Here, the specific group of UEs may include at least one UE.

The DCI may have a various format according to type, number, and size (e.g., the number of bits constituting information fields) of information fields. The DCI format 0, 3, 3A, 4, etc. may be used for uplink, and the DCI format 1, 1A, 1B, 1C, 1D, 2, 2A, 2B, 2C, etc. may be used for downlink. Information included in the DCI may vary according to the format of the DCI. For example, at least one of a carrier indicator field (CIF), resource block allocation information, modulation and coding scheme (MCS) information, RV information, new data indicator (NDI), transmit power control (TPC) information, HARQ process number information, precoding matrix indicator (PMI) (or, PMI confirmation information), hopping flag, flag field, etc. may be selectively included in the DCI according to the format of the DCI. Thus, the size of control information may vary according to the format of DCI. Also, the same DCI format may be used for transmitting two or more types of control information. In this case, control information may be classified according to the flag field included in the DCI. Control information included in the DCI, according to respective DCI formats, may be explained as the following table 1.

TABLE 1

| DCI FORMAT | CONTROL INFORMATION |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The PDCCH may be allocated to a set of one or more contiguous control channel elements (CCEs), and the EPDCCH may be allocated to a set of one or more contiguous enhanced CCEs (ECCEs). The CCE or ECCE may be a logical allocation unit, and comprise a plurality of resource element groups (REGs). The size of bits transmitted through the PDCCH (or, EPDCCH) may be determined according to the number of CCEs or ECCEs, coding rate, etc.

Figure 9:
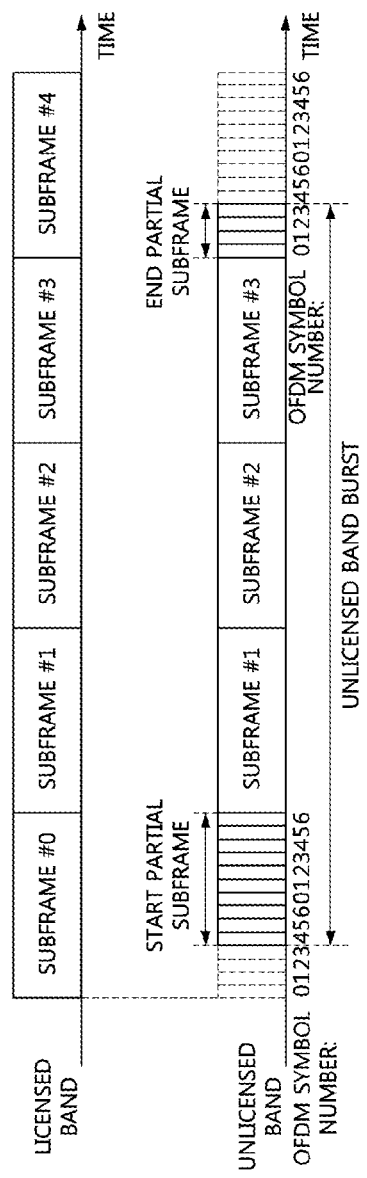
FIG. 9 is a timing diagram illustrating an embodiment of an unlicensed band burst.

FIG. 9 is a timing diagram illustrating an embodiment of an unlicensed band burst.

Referring to FIG. 9, the timing of a subframe (or, slot or OFDM symbol) in the licensed band may be identical to the timing of a subframe (or, slot or OFDM symbol) in the unlicensed band. Here, the licensed band may be referred to as a "licensed band cell" or a "primary cell (PCell)." The unlicensed band may be referred to as an "unlicensed band cell," a "secondary cell (SCell)," or a "LAA cell." In the licensed band, signals can be transmitted continuously. That is, burst transmissions in the licensed band may occur continuously.

On the contrary, burst transmissions in the unlicensed band may occur discontinuously. For example, unlicensed band burst may occur in unit of 4 subframes. A start subframe among subframes constituting the unlicensed band burst may have the length of less than 1 ms. The start subframe having the length of less than 1 ms may be referred to as a "start partial subframe." Also, an end subframe among subframes constituting the unlicensed band burst may have the length of less than 1 ms. The end subframe having the length of less than 1 ms may be referred to as an "end partial subframe." The sum of the lengths of the start partial subframe and the end partial subframe may be configured to be 1 ms. For example, the start partial subframe may comprise the OFDM symbol #4 of a first slot to the OFDM symbol #6 of a second slot. In this case, the end partial subframe may comprise OFDM symbol #0 to OFDM symbol #3 of the first slot.

The start point of the unlicensed band burst (or, the start partial subframe) may be configured within a predetermined set of OFDM symbol numbers. For example, the start point of the unlicensed band burst may be configured as the OFDM symbol #0 of the first slot or the OFDM symbol #0 of the second slot. Alternatively, the start point of the unlicensed band burst in the TDD-based network may be configured to be an OFDM symbol located after a predetermined offset from the OFDM symbol #0 of the first slot. Here, the predetermined offset may be a value corresponding to a time duration of "GP+UpPTS." For example, the start point of the unlicensed band burst in the TDD-based network may be OFDM symbol #0, #2, #3, or #5 of the first slot, or OFDM symbol #1 of the second slot in the subframe.

Alternatively, the start point of the unlicensed band burst may be configured to be a start point or an end point of the PDCCH, or a transmission point of a reference signal (e.g., cell-specific reference signal (CRS), etc.). For example, the start point of the unlicensed band burst may be the OFDM symbol #0 or symbol #4 of the first slot of the subframe. However, the start point of the unlicensed band burst may not be restricted to the above-described examples, and may be configured to be any OFDM symbol of the subframe.

The end point of the unlicensed band burst (or, the end partial subframe) may be configured within a predetermined set of OFDM symbol numbers. For example, the end point of the unlicensed band burst may be the OFDM symbol #0 of the first slot of the subframe, or the OFDM symbol #0 of the second slot of the subframe. Alternatively, the end point of the unlicensed band burst may be configured to be a point after the predetermined number (x) of subframes from the start point of the unlicensed band burst. Here, the x may be a positive integer number. For example, when the start point of the unlicensed band burst is the OFDM symbol #4 of the first slot of the subframe, the end point of the unlicensed band burst may be configured to be an OFDM symbol #3 of a first slot of a subframe located after x subframes from the start point of the unlicensed band burst. The end point of the unlicensed band burst may not be restricted to the above-described examples, and may be configured to be any OFDM symbol in the subframe.

Meanwhile, a cyclic redundancy check (CRC) for error detection may adhere to the control information which is transmitted through the PDCCH (or, EPDCCH) based on the DCI format. The CRC may be masked (e.g., scrambled) based on a radio network temporary identifier (RNTI) according to the communication node (e.g., UE, station, etc.) to receive the PDCCH (or, EPDCCH). Alternatively, the CRC be masked (e.g., scrambled) based on the RNTI according to usage. A value and a type of the RNTI may be as following table 2.

TABLE 2

| VALUE (HEXADECIMAL) | RNTI |
| --- | --- |
| 0000 | N/A |
| 0001~003C | RA-RNTI, C-RNTI, Semi-Persistent Scheduling (SPS) C-RNTI, Temporary C-RNTI, enhanced interference management and traffic adaptation (eIMTA)-RNTI, TPC-PUCCH-RNTI, TPC-PUSCH-RNTI, and sidelink (SL)-RNTI |
| 003D~FFF3 | C-RNTI, SPS C-RNTI, eIMTA-RNTI, Temporary C-RNTI, TPC-PUCCH-RNTI, TPC-PUSCH-RNTI, and SL-RNTI |
| FFF4~FFFC | Reserved for future use |
| FFFD | M-RNTI |
| FFFE | P-RNTI |
| FFFF | SI-RNTI |

The usage of the RNTI may be as following table 3.

TABLE 3

| RNTI | USAGE |
| --- | --- |
| P-RNTI | Paging and System Information change notification |
| SI-RNTI | Broadcast of System Information |
| M-RNTI | MCCH Information Change notification |
| RA-RNTI | Random Access Response |
| eIMTA-RNTI | eIMTA TDD UL/DL Configuration Notification |
| Temporary C-RNTI | Contention Resolution (when no valid C-RNTI is available) |
| Temporary C-RNTI | Msg3 transmission |
| C-RNTI | Dynamically scheduled unicast transmission (uplink or downlink) |
| C-RNTI | Triggering of PDCCH ordered random access |
| SPS C-RNTI | Semi-Persistently scheduled unicast transmission (activation, reactivation and retransmission) |
| SPS C-RNTI | Semi-Persistently scheduled unicast transmission (deactivation) |
| TPC-PUCCH-RNTI | Physical layer uplink power control |
| TPC-PUSCH-RNTI | Physical layer uplink power control |
| SL-RNTI | Dynamically scheduled sidelink transmission |

An identifier related to the unlicensed band cell may be referred to as a U-RNTI. Alternatively, the identifier related to the unlicensed band cell may be referred to as various U-RNTI according to information of the unlicensed band cell. The U-RNTI may be transmitted to the UE through the RRC signaling.

The PDCCH (or, EPDCCH) including the CRC which is masked (e.g., scrambled) based on the U-RNTI may be transmitted through a common search space or a UE-specific search space. In the common search space or the UE-specific search space, location of the PDCCH (or, EPDCCH) may be determined based on an aggregation level of the CCE (or, ECCE), a CCE (or, ECCE) index calculated by the U-RNTI, and so on. In the common search space or the UE-specific search space, location $S_k^{(L)}$ of CCE (or, ECCE) candidates, as monitoring targets, may be determined based on following equation 1. For obtaining the PDDCH (or, EPDCCH), the UE may monitor the CCE (or, ECCE) candidates.

$$S_k^{(L)}=L\{(Y_k+m')\mathrm{mod}[N_{CCE,k}/L]\} \quad \text{[Equation 1]}$$

The L may indicate the aggregation level. For example, the L may be 1, 2, 4, or 8. The aggregation level of the CCE (or, ECCE) included in the PDCCH (or, EPDCCH) which is transmitted in the partial subframe (e.g., subframe whose length is less than 1 ms) of the unlicensed band may be a value (e.g., 16, 32, etc.) more than 8. In the common search space, the $Y_k$ may be set to 0. Also, the $Y_k$ may be determined based on the RNTI (e.g., U-RNTI in the unlicensed band). In the common search space (or, UE-specific search space), the m' may be a positive integer less than the total number ($M^{(L)}$−1) of PDCCH candidates (or, EPDCCH candidates, CCE candidates, ECCE candidates) as the monitoring targets. The $N_{CCE,k}$ may indicate the total number of CCEs (or, ECCEs) included in a subframe k.

Meanwhile, the U-RNTI may be set to a specific value for the UE, a common value for the base station, a common value for the unlicensed band cell, a reserved value, etc. The U-RNTI having the specific value for the UE may be referred to as a "UE-specific U-RNTI." The U-RNTI having the common value for the base station may be referred to as a "base station common U-RNTI." The U-RNTI having the common value for the unlicensed band cell may be referred to as an "unlicensed band cell common U-RNTI." The base station common U-RNTI and the unlicensed band cell common U-RNTI may be used for transmitting common control information.

The UE-specific U-RNTI may be transmitted with information related to configuration, addition, and so on of the unlicensed band cell through the RRC signaling. A method of the RRC signaling for the UE-specific U-RNTI may be as follows.

Figure 10:
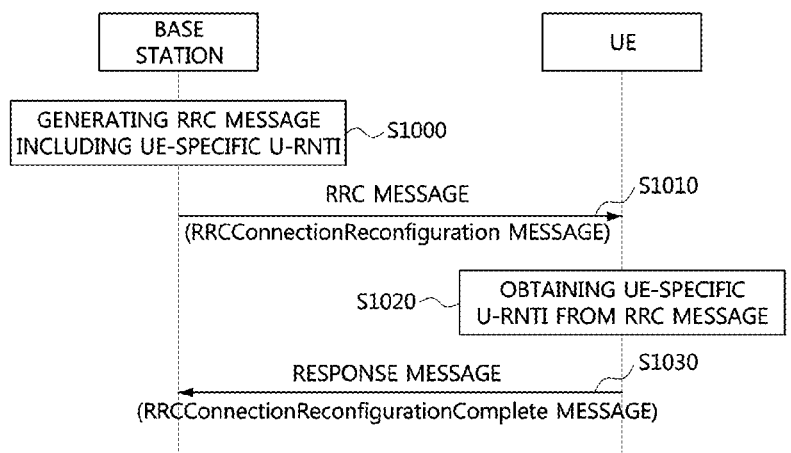
FIG. 10 is a sequence chart illustrating a method of RRC signaling for a UE-specific U-RNTI.

FIG. 10 is a sequence chart illustrating a method of RRC signaling for a UE-specific U-RNTI.

Referring to FIG. 10, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. A timing of the subframe (or, slot, OFDM symbol, etc.) of the licensed band may be identical to a timing of the subframe (or, slot, OFDM symbol, etc.) of the unlicensed band.

The base station may generate a RRC message (e.g., RRCConnectionReconfiguration message) including the UE-specific U-RNTI (or, base station common U-RNTI, unlicensed band cell common U-RNTI) (S1000). The base station may transmit the RRC message (S1010). The RRC message may be transmitted in the licensed band or the unlicensed band. The UE may receive the RRC message from the base station, and obtain the UE-specific U-RNTI (or, base station common U-RNTI, unlicensed band cell common U-RNTI) from the received RRC message (S1020). When the RRC message is received, the UE may transmit a response message (e.g., RRCConnectionReconfigurationComplete message) in response to the RRC message to the base station (S1030).

Meanwhile, the base station common U-RNTI may be used for transmitting configuration related information and system information of the unlicensed band cell which is configured by the base station. The configuration related information and system information of the unlicensed band cell may be referred to as "UCell configuration/system information." The base station common U-RNTI may be pre-set identical or similar to the SI-RNTI. Alternatively, the base station common U-RNTI may be transmitted through the RRC signaling. The unlicensed band cell common U-RNTI may be set per the unlicensed band cell. The unlicensed band cell common U-RNTI may be transmitted through the RRC signaling. For example, in a procedure that the unlicensed band cell is newly configured to a secondary cell (SCell), the unlicensed band cell common U-RNTI may be included in the RRC message (e.g., RRCConnectionReconfiguration message) to be transmitted.

The U-RNTI may be used for transmitting unlicensed band related information (e.g., configuration/addition/modification/release related information of the unlicensed band cell, system information, etc.) supported by the base station. Also, the U-RNTI may be used for transmitting control information of different unlicensed band cell. Also, the U-RNTI may be used for transmitting a dynamic activation or deactivation request message of the unlicensed band cell. The U-RNTI may be differently set according to usage and a reception entity of the PDCCH (or, EPDCCH). For example, the U-RNTI may be set to be used for transmitting the activation or deactivation request message of a common unlicensed band cell. Alternatively, the U-RNTI may be set to be used for transmitting the activation or deactivation request message of a UE-specific unlicensed band cell.

The U-RNTI related information (e.g., a value, a period, and so on of the U-RNTI) used for transmitting the UCell configuration/system information may be transmitted through the RRC signaling. The scheduling information for the UCell configuration/system information may be transmitted through the PDCCH (or, EPDCCH) in a common search space of the licensed band cell (e.g., licensed band primary cell (PCell) or licensed band SCell). The UCell configuration/system information may be transmitted through the PDSCH indicated by the scheduling information. The CRC of the DCI which includes the scheduling information, the control information, and so on for the UCell configuration/system information may be masked (e.g., scrambled) based on the U-RNTI. The UCell configuration/system information may be transmitted periodically or non-periodically. When the UCell configuration/system information is transmitted periodically, information indicating a transmission period may be transmitted through the RRC signaling. In this case, the UE may obtain the information indicating the transmission period through the RRC signaling, receive the PDCCH (or, EPDCCH) based on the transmission period, and obtain the UCell configuration/system information from the PDCCH (or, EPDCCH) using the U-RNTI.

The UCell configuration/system information may include at least one of UE requirements related to the unlicensed band cell, operation/management related information of the unlicensed band cell, and information related to the unlicensed band supported by the base station. For example, the UCell configuration/system information may include at least one of channel information of the unlicensed band, a maximum transmission power in the unlicensed band, a channel access manner (e.g., a channel access manner based on the LBT operation, etc.) in the unlicensed band, a maximum transmission duration in the unlicensed band, a maximum occupancy time in the unlicensed band, channel state measurement related information (e.g., a measurement time and a period of a received signal strength (e.g., a received signal strength indication (RSSI)), a RSSI histogram, etc.) in the unlicensed band, configuration information of the subframe for a multicast broadcast single frequency network (MB-SFN) in the unlicensed band cell, configuration information of the start subframe included in the unlicensed band burst (e.g., information indicating to whether the start subframe is the partial subframe, the number of OFDM symbols included in the start subframe, an OFDM symbol number (or, a set of OFDM symbol numbers) in which the start subframe is initiated, etc.), and configuration information of the end subframe included in the unlicensed band burst (e.g., information indicating to whether the end subframe is the partial subframe, the number of OFDM symbols included in the end subframe, a OFDM symbol number (or, a set of OFDM symbol numbers) in which the end subframe is terminated, etc.). The UCell configuration/system information may be transmitted to the UE through the RRC message.

When the UCell configuration/system information includes the configuration information of the start subframe included in the unlicensed band burst, the set of the OFDM symbol numbers in which the start subframe is initiated may be {3, 6} or {0, 3, 6}. In the set of the OFDM symbol numbers, an OFDM symbol #7 may be used instead of the OFDM symbol #6.

When the UCell configuration/system information includes the configuration information of the end subframe included in the unlicensed band burst, the set of the OFDM symbol numbers in which the end subframe is terminated may be {3, 9, 10, 11, 12}, {9, 10, 11, 12}, {3, 9, 10, 11, 12, 13}, or {9, 10, 11, 12, 13}. When the type 2 frame is used, the set of the OFDM symbol numbers may be set based on DwPTS configuration. Alternatively, the set of the OFDM symbol numbers may be set regardless of the DwPTS configuration.

Meanwhile, the UE (e.g., the UE which wants to configure the unlicensed band cell) may obtain configuration related information of the unlicensed band cell by receiving the UCell configuration/system information. The UE may configure the unlicensed band cell using the configuration related information of the unlicensed band cell. Because the UCell configuration/system information is transmitted based on the U-RNTI instead of the SI-RNTI, it is not necessary that all UEs perform receiving and decoding operations of the PDSCH including the UCell configuration/system information. For example, the UE which does not want to configure the unlicensed band cell may not use the U-RNTI. Therefore, the UE which does not want to configure the unlicensed band cell may not decode the PDCCH (or, EPDCCH) including the scheduling information for the UCell configuration/system information, and not receive the PDSCH including the UCell configuration/system information. On the other hand, the UE which wants to configure the unlicensed band cell may receive the DCI including the CRC masked (e.g., scrambled) by the U-RNTI in the PDCCH (or, the EPDCCH) of the common search space, and then obtain the scheduling information for the UCell configuration/system information by performing the descrambling operation on the DCI based on the U-RNTI. The UE which wants to configure the unlicensed band cell may receive the UCell configuration/system information through the PDSCH indicated by the scheduling information. The CRC of the PDSCH including the UCell configuration/system information may be masked (e.g., scrambled) based on the U-RNTI. In this case, the UE may obtain the UCell configuration/system information by performing the descrambling operation based on the U-RNTI.

Next, use cases of the unlicensed band cell common U-RNTI will be described. The unlicensed band cell common U-RNTI may be set per the unlicensed band cell. Information (e.g., a value, a period, and so on of the U-RNTI) related to the unlicensed band cell common U-RNTI may be transmitted through the RRC signaling. For example, the information related to the unlicensed band cell common U-RNTI may be transmitted through the RRCConnectionReconfiguration message. Alternatively, the information related to the unlicensed band cell common U-RNTI may be included in the UCell configuration/system information to be transmitted.

The unlicensed band cell common U-RNTI may be used for transmitting the control information per the unlicensed band cell in the licensed band cell or the unlicensed band cell. For example, the unlicensed band cell common U-RNTI which is set for an unlicensed band cell-A may be used for transmitting the UCell configuration/system information for the unlicensed band cell-A. The CRC of the PDCCH (or, EPDCCH) including the scheduling information for the UCell configuration/system information for the unlicensed band cell-A may be masked (e.g., scrambled) based on the unlicensed band cell common U-RNTI which is set for the unlicensed band cell-A. The CRC of the PDSCH including the UCell configuration/system information for the unlicensed band cell-A may be masked (e.g., scrambled) based on the unlicensed band cell common U-RNTI which is set for the unlicensed band cell-A. Therefore, the UE may obtain the UCell configuration/system information for the unlicensed band cell-A by performing the descrambling operation based on the unlicensed band cell common U-RNTI which is set for the unlicensed band cell-A.

The control information per the unlicensed band cell may be transmitted periodically or non-periodically. When the control information per the unlicensed band cell is periodically transmitted, period information for the control information per the unlicensed band cell may be transmitted through the RRC signaling. Alternatively, a discovery reference signal (DRS) which is periodically transmitted in the unlicensed band may include the control information per the unlicensed band cell. In this case, the control information per the unlicensed band cell may be periodically transmitted based on a period of the DRS. Also, the CRC of the PDCCH (or, EPDCCH, PDSCH) in which the DRS is configured may be masked (e.g., scrambled) based on the unlicensed band cell common U-RNTI. Therefore, the UE may obtain the control information per the unlicensed band cell by performing the descrambling operation based on the unlicensed band cell common U-RNTI.

The control information per the unlicensed band cell may include at least one of the UE requirements related to the unlicensed band cell, the operation/management related information of the unlicensed band cell, and the information related to the unlicensed band supported by the base station. For example, the control information per the unlicensed band cell may include at least one of the channel information of the unlicensed band, the maximum transmission power in the unlicensed band, the channel access manner (e.g., the channel access manner based on the LBT operation, etc.) in the unlicensed band, the maximum transmission duration in the unlicensed band, the maximum occupancy time in the unlicensed band, and the channel state measurement related information (e.g., the measurement time and the period of the received signal strength (e.g., the RSSI), the RSSI histogram, etc.) in the unlicensed band.

Meanwhile, the UE which has configured the unlicensed band cell may obtain the control information per the unlicensed band cell through the PDCCH (or, EPDCCH, PDSCH). For example, the UE may obtain the control information per the unlicensed band cell by performing the descrambling operation on the PDCCH (or, EPDCCH, PDSCH) based on the unlicensed band cell common U-RNTI. Therefore, the UE which has configured the unlicensed band cell (e.g., UE which uses the unlicensed band cell common U-RNTI) may only obtain the control information per the unlicensed band cell.

Also, the unlicensed band cell common U-RNTI may be used for transmitting common control information of the unlicensed band cell. Alternatively, the unlicensed band cell common U-RNTI may be used for transmitting the DCI through the PDCCH (or, EPDCCH) in the common search space of the unlicensed band. The DCI may be transmitted through the common signaling. For all unlicensed band cells, the unlicensed band cell common U-RNTI may be set identical. Alternatively, the unlicensed band cell common U-RNTI may be differently set per the unlicensed band cell. When the unlicensed band cell common U-RNTI is differently set per the unlicensed band cell, the unlicensed band cell common U-RNTI may be transmitted to the UE through the RRC message.

When the SCell is configured in the unlicensed band, the DCI including the common control information of the unlicensed band cell may be transmitted through the PDCCH (or, EPDCCH) in the common search space of the unlicensed band SCell. Therefore, the UE may receive the PDCCH (or, EPDCCH) by monitoring on the common search space in the unlicensed band SCell. To reduce the number of blind detections for monitoring on the PDCCH (or, EPDCCH), a fixed aggregation level or a fixed DCI format may be used. For example, the fixed aggregation level may be 4 or 8. The fixed DCI format may be 1A or 1C. The common control information of the unlicensed band cell may include at least one following information.

Information indicating to whether the subframe including the common control information of the unlicensed band cell (hereafter, "current subframe") is the start subframe of the unlicensed band burst (e.g., a set of consecutive subframes).

Information indicating to whether the current frame is the end subframe of the unlicensed band burst.

Information indicating to whether the current frame is the partial subframe.

Information indicating the number of the OFDM symbols included in the current subframe.

Information indicating the OFDM symbol number (or, the set of the OFDM symbol numbers) in which the current subframe is initiated.

Information indicating the OFDM symbol number (or, the set of the OFDM symbol numbers) in which the current subframe is terminated.

Information indicating a CRS port of the current subframe.

Information indicating the number of the OFDM symbols corresponding to a time domain, in which the CRS is configured, of the current subframe.

MBSFN related information in the current subframe.

Information indicating the number of consecutive subframes after the current subframe.

Information indicating to whether the current frame is only constituted of the DRS.

Information indicating the transmission power of the reference signal (e.g., the CRS, a channel state information-reference signal (CSI-RS), etc.) in the current subframe or the unlicensed band burst.

Information indicating an offset of the transmission power of the reference signal (e.g., the CRS, the CSI-RS, etc.) in the current subframe or the unlicensed band burst.

Information indicating whether a subframe after the current subframe (hereafter, "next subframe") is the partial subframe.

Information indicating the number of the OFDM symbols included in the next subframe.

Information indicating the OFDM symbol number (or, the set of the OFDM symbol numbers) in which the next subframe is initiated.

Information indicating the OFDM symbol number (or, the set of the OFDM symbol numbers) in which the next subframe is terminated.

Meanwhile, methods for transmitting and receiving the common control information of the unlicensed band cell will be described.

Figure 11:
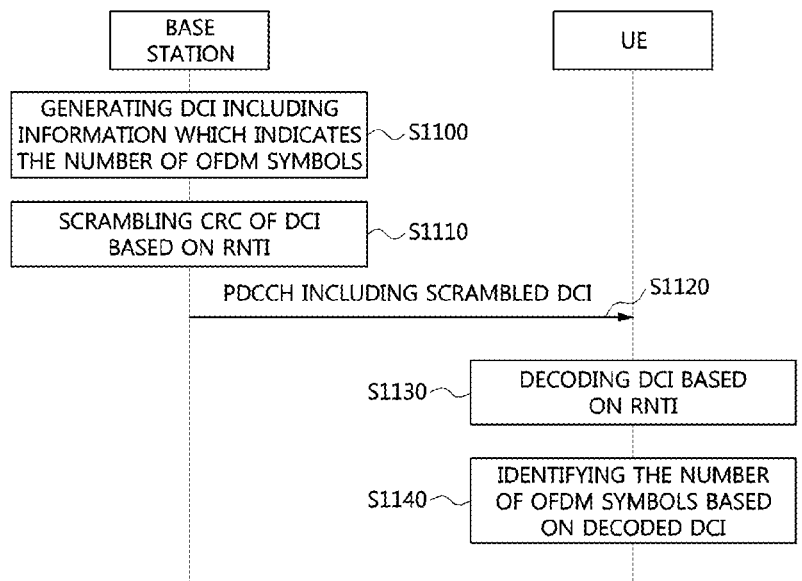
FIG. 11 is a sequence chart illustrating a method for transmitting and receiving common control information of an unlicensed band cell.

FIG. 11 is a sequence chart illustrating a method for transmitting and receiving common control information of an unlicensed band cell.

Referring to FIG. 11, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band.

The base station may generate the DCI which includes information indicating the number of the OFDM symbols of a subframe #(n−1) or a subframe # n (S1100). Also, the DCI may further include information indicating to whether the subframe #(n−1) or the subframe # n is the partial subframe. The subframe #(n−1) or the subframe # n may be the start subframe among a plurality of subframes included in the unlicensed band burst. For example, when the subframe # n is the start subframe among the plurality of subframes included in the unlicensed band burst, the subframe #(n−1) may be located prior to the unlicensed band burst. In this case, a length of the subframe #(n−1) may be 1 ms, and a length of the subframe # n may be less than 1 ms. That is, the subframe # n may be the partial subframe. When the subframe #(n−1) is the start subframe among the plurality of subframes included in the unlicensed band burst, the subframe # n may be located after the subframe #(n−1) in the unlicensed band burst. In this case, a length of the subframe #(n−1) may be less than 1 ms, and a length of the subframe # n may be 1 ms. That is, the subframe #(n−1) may be the partial subframe.

Alternatively, the subframe #(n−1) or the subframe # n may be the end subframe among the plurality of subframes included in the unlicensed band burst. For example, when the subframe # n is the end subframe among the plurality of subframes included in the unlicensed band burst, the subframe #(n−1) may be located prior to the subframe # n in the unlicensed band burst. In this case, a length of the subframe #(n−1) may be 1 ms, and a length of the subframe # n may be less than 1 ms. That is, the subframe # n may be the partial subframe. When the subframe #(n−1) is the end subframe among the plurality of subframes included in the unlicensed band burst, the subframe # n may be located after the unlicensed band burst. In this case, a length of the subframe #(n−1) may be less than 1 ms, and a length of the subframe # n may be 1 ms. That is, the subframe #(n−1) may be the partial subframe.

The base station may perform a masking operation (or, scrambling operation) on the CRC of the DCI using the RNTI (S1110). The RNTI may be transmitted to UE through the RRC signaling. The RNTI may be the C-RNTI or the U-RNTI (e.g., UE-specific U-RNTI, base station common U-RNTI, unlicensed band cell common U-RNTI, etc.).

The base station may transmit the PDCCH (or, EPDCCH) including the masked (or, scrambled) DCI in the subframe #(n−1) of the unlicensed band (S1120). The UE may receive the PDCCH (or, EPDCCH) including the masked (or, scrambled) DCI in the subframe #(n−1) of the unlicensed band. The UE may perform decoding/descrambling operations on the DCI included in the PDCCH (or, EPDCCH) using the RNTI (S1130). The UE may identify the number of the OFDM symbols of the subframe #(n−1) or the subframe # n based on the decoded/descrambled DCI (S1140). Also, the UE may identify to whether the subframe #(n−1) or the subframe # n is the partial subframe based on the decoded/descrambled DCI.

Meanwhile, the U-RNTI may be used for activating or deactivating the unlicensed band cell. The U-RNTI used for activating the unlicensed band cell may be referred to as an "activation U-RNTI." The U-RNTI used for deactivating the unlicensed band cell may be referred to as a "deactivation U-RNTI." The activation U-RNTI and the deactivation U-RNTI may be transmitted to the UE through the RRC signaling. For example, the activation U-RNTI and the deactivation U-RNTI may be included in the UCell configuration/system information to be transmitted. Therefore, the UE may identify the activation U-RNTI and the deactivation U-RNTI by receiving the UCell configuration/system information. Also, the activation U-RNTI and the deactivation U-RNTI may be included in the control information related to the unlicensed band cell used for a RRC-ConnectionReconfiguration procedure. Therefore, the UE may identify the activation U-RNTI and the deactivation U-RNTI by performing the RRCConnectionReconfiguration procedure.

The activation U-RNTI may be identical or similar to the deactivation U-RNTI. The activation U-RNTI (or, deactivation U-RNTI) may be set per the unlicensed band cell. In this case, the activation U-RNTI (or, deactivation U-RNTI) may be used for requesting an activation (or, deactivation) of a specific unlicensed band cell to all UEs which belong to the specific unlicensed band cell. The CRC included in the PDCCH (or, EPDCCH) may be masked (e.g., scrambled) based on the activation U-RNTI (or, deactivation U-RNTI) which is set for the specific unlicensed band cell, and the PDCCH (or, EPDCCH) including the masked (or, scrambled) CRC may be transmitted in the common search space or the UE-specific search space. The UE-specific search space may be indicated by a CCE (or, ECCE) index which is defined according to the activation U-RNTI (or, deactivation U-RNTI).

The activation U-RNTI (or, deactivation U-RNTI) may be set per the UE. For example, the activation U-RNTI (or, deactivation U-RNTI) may be set for a specific UE among UEs belonging to the unlicensed band cell for which the activation (or, deactivation) is requested. The activation U-RNTI (or, deactivation U-RNTI) which is set for the specific UE may be transmitted to the specific UE through the RRC signaling. The CRC included in the PDCCH (or, EPDCCH) may be masked (or, scrambled) based on based on the activation U-RNTI (or, deactivation U-RNTI) which is set for the specific UE, and the PDCCH (or, EPDCCH) including the masked (or, scrambled) CRC may be transmitted in the UE-specific search space. The UE-specific search space may be indicated by the CCE (or, ECCE) index which is defined according to the activation U-RNTI (or, deactivation U-RNTI). Therefore, the UE may receive the PDCCH (or, EPDCCH) using the activation U-RNTI (or, deactivation U-RNTI) in UE-specific search space candidates, and then activate (or, deactivate) the unlicensed band cell based on information indicated by the received PDCCH (or, EPDCCH).

The CRC may be masked (or, scrambled) based on the activation U-RNTI (or, deactivation U-RNTI) and the C-RNTI which is set per the UE at the same time. The PDCCH (or, EPDCCH) based on modulo 2 between the C-RNTI and the activation U-RNTI (or, deactivation U-RNTI) may be transmitted in the UE-specific search space. The CCE (or, ECCE) index for a transmission of the PDCCH (or, EPDCCH) may be calculated using the C-RNTI or a value according to modulo 2 between the C-RNTI and the activation U-RNTI (or, deactivation U-RNTI). The UE may receive the PDCCH (or, EPDCCH) using the activation U-RNTI (or, deactivation U-RNTI) in the UE-specific search space indicated by the value according to modulo 2 between the C-RNTI and the activation U-RNTI (or, deactivation U-RNTI), and then activate (or, deactivate) the unlicensed band cell based on information indicated by the received PDCCH (or, EPDCCH).

Meanwhile, when the PDCCH (or, EPDCCH) including the CRC which is masked (or, scrambled) based on the activation U-RNTI (or, deactivation U-RNTI) is received in the subframe # n, the UE may activate (or, deactivate) the unlicensed band cell from a subframe #(n+k). The k may be an integer equal to or more than 1. For example, the k may be 2, 4, 8, etc. The k may be a fixed value, and may be pre-set in the base station and the UE. Alternatively, the k may be transmitted to the UE through the RRC signaling. Alternatively, the DCI may include a new field indicating the k, and the DCI may be transmitted to the UE through the PDCCH (or, EPDCCH). Alternatively, the k may be set based on UE capabilities (e.g., receiving/decoding capability). In this case, the k may be transmitted through a report procedure of UE capability information (or, a transmission procedure of a response of the RRC signaling related to the unlicensed band cell).

The information which is transmitted through the RRC message (or, RRC signaling) defined for above-described U-RNTI may be included in a new system information block (SIB) for the unlicensed band cell. The new SIB for the unlicensed band cell may be transmitted periodically. In this case, the U-RNTI or the SI-RNTI may be used.

Next, activation and deactivation methods of the licensed band cell will be described.

The activation and deactivation for the licensed band SCell may be performed based on an activation/deactivation medium access control (MAC) control element (CE). When an index of the licensed band SCell is set to 0 in the activation/deactivation MAC CE, it may indicate that the licensed band SCell is operated in a deactivation state. When the index of the licensed band SCell is set to 1 in the activation/deactivation MAC CE, it may indicate that the licensed band SCell is operated in an activation state.

Also, the activation and deactivation for the licensed band SCell may be performed based on a time indicated by a SCell deactivation time field included in the RRC message. The SCell deactivation time field may indicate 20 ms, 40 ms, 80 ms, 160 ms, 320 ms, 640 ms, 1280 ms, etc. For example, when the time indicated by the SCell deactivation time field is expired, a state of the licensed band SCell may be transited from the activation state to the deactivation state. When the SCell deactivation time field is not set, it may indicate that the SCell deactivation time field is set to infiniteness. The time indicated by the SCell deactivation time field may be applied to all SCells of the licensed band.

For example, when the activation/deactivation MAC CE indicating the activation of the licensed band SCell is received in the subframe # n, the UE may activate the licensed band SCell and activate (or, re-activate) a timer based on the time indicated by the SCell deactivation time field from the subframe #(n+8). After that, when the PDCCH (or, EPDCCH) for uplink or downlink scheduling (e.g., a self-scheduling or a cross carrier scheduling) for the activated licensed band SCell is received, the UE may re-activate the timer based on the time indicated by the SCell deactivation time field. When the activation/deactivation MAC CE indicating the deactivation of the licensed band SCell is received or the time indicated by the SCell deactivation time field is expired, the UE may deactivate the licensed band SCell. In this case, the UE may deactivate the licensed band SCell prior to the subframe #(n+8).

Meanwhile, the activation and the deactivation of the unlicensed band cell may be performed based on the activation/deactivation MAC CE and the SCell deactivation time field. When the unlicensed band is occupied by other communication node, the UE may not receive the PDCCH (or, EPDCCH) until the time indicated by the SCell deactivation time field is expired (e.g., the state of the unlicensed band cell is transited from the activation state to the deactivation state. In this case, the reactivation of the unlicensed band cell may be requested. To resolve this problem, the activation and the deactivation of the unlicensed band cell may be performed as follows.

Activation/Deactivation Methods Based on Minimum Deactivation Time

The minimum deactivation time may be additionally set regardless of the time indicated by the SCell deactivation time field included in the RRC message. The minimum deactivation time may be pre-set in the base station and the UE. Alternatively, the minimum deactivation time may be transmitted to the UE through the RRC message. The UE may obtain the SCell deactivation time field and the minimum deactivation time, and compare the time indicated by the SCell deactivation time field with the minimum deactivation time. When the time indicated by the SCell deactivation time field is more than the minimum deactivation time, the UE may activate the timer based on the time indicated by the SCell deactivation time field, and deactivate the unlicensed band cell when the timer is expired. On the other hand, when the time indicated by the SCell deactivation time field is less than the minimum deactivation time, the UE may activate the timer based on the minimum deactivation time, and deactivate the unlicensed band cell when the timer is expired. The minimum deactivation time may indicate infiniteness. In this case, the UE may activate the timer based on the minimum deactivation time regardless of the SCell deactivation time field.

Activation/Deactivation Methods Based on Time Indicated by SCell Deactivation Time Field The UE may calculate a modified time by multiplying a pre-defined integer and the time indicated by the SCell deactivation time field. The UE may activate the timer based on the modified time, and then deactivate the unlicensed band cell when the timer is expired. The pre-defined integer may be pre-defined in the base station and the UE. Alternatively, the pre-defined integer may be transmitted to the UE through the RRC message.

Activation/Deactivation Methods Based on Unlicensed Band SCell Deactivation Time Field Defined for Unlicensed Band SCell The UE may obtain the unlicensed band SCell deactivation time field in the licensed band or the unlicensed band through the RRC signaling. The unlicensed band SCell deactivation time field may be used for the communication node which is operated in the unlicensed band. The UE may activate the timer based on the time indicated by the unlicensed band SCell deactivation time field, and then deactivate the unlicensed band SCell when the timer is expired.

The time (e.g., deactivation timer) indicated by the unlicensed band SCell deactivation time field may be set per SCell. That is, the deactivation timer for the unlicensed band SCell may be differently set per SCell. Also, the deactivation timer for the unlicensed band SCell may be different from the deactivation timer for the licensed band SCell.

Activation/Deactivation Methods Based on SCell Deactivation Time Field Indicating Infiniteness When the SCell deactivation time field indicates infiniteness, the UE may activate or deactivate the unlicensed band cell based on the activation/deactivation MAC CE.

Meanwhile, unlike the activation/deactivation of the licensed band cell, the activation/deactivation of the unlicensed band cell may be performed based on the PDCCH (or, EPDCCH) instead of the activation/deactivation MAC CE. Activation/deactivation methods of the unlicensed band cell based on the PDCCH (or, EPDCCH) may be as follows.

Figure 12:
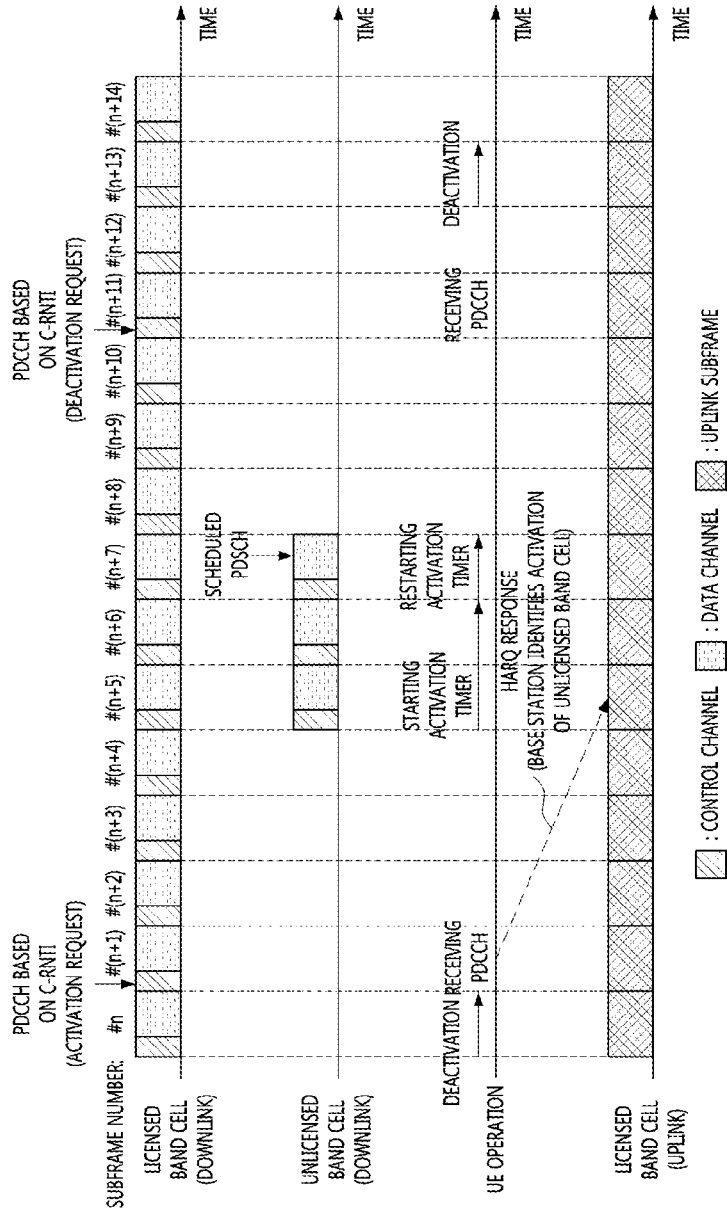
FIG. 12 is a timing diagram illustrating a first embodiment of an activation method of an unlicensed band cell.

FIG. 12 is a timing diagram illustrating a first embodiment of an activation method of an unlicensed band cell.

Referring to FIG. 12, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including information for requesting the activation of the unlicensed band cell (hereafter, "activation request information") in a subframe #(n+1) of the licensed band cell (or, other unlicensed band cell which is in the activation state). The CRC of the PDCCH (or, EPDCCH) including the activation request information may be masked (e.g., scrambled) based on the C-RNTI. Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be constituted of 1 bit. For example, the activation/deactivation MAC CE which is set to 0 may request the activation of the unlicensed band cell, and the activation/deactivation MAC CE which is set to 1 may request the deactivation of the unlicensed band cell. On the other hand, the activation/deactivation MAC CE which is set to 0 may request the deactivation of the unlicensed band cell, and the activation/deactivation MAC CE which is set to 1 may request the activation of the unlicensed band cell.

The UE may receive the PDCCH (or, EPDCCH) in the subframe #(n+1) of the licensed band cell. The UE may obtain the activation request information included in the PDCCH (or, EPDCCH) by performing the descrambling operation based on the C-RNTI. That is, by identifying the activation request information included in the PDCCH (or, EPDCCH), the UE may determine that the activation of the unlicensed band cell is requested from a subframe #(n+1+$N_{Act}$). For example, the UE may determine that the activation of the unlicensed band cell indicated by the CIF included in the DCI is requested. Alternatively, the UE may determine that the activation of the unlicensed band cell is requested based on the activation/deactivation MAC CE.

The $N_{Act}$ is an integer equal to or more than 1. For example, the $N_{Act}$ is 2, 4, 8, etc. The $N_{Act}$ may be pre-set in the base station and the UE. Alternatively, the $N_{Act}$ may be transmitted to the UE through the RRC signaling. Alternatively, the DCI may include a new field indicating the $N_{Act}$, and the DCI may be transmitted to the UE through the PDCCH (or, EPDCCH). Alternatively, the $N_{Act}$ may be set based on the UE capabilities (e.g., receiving/decoding capability). In this case, the $N_{Act}$ may be transmitted through the report procedure of the UE capability information (or, the transmission procedure of the response of the RRC signaling related to the unlicensed band cell).

Meanwhile, because the unlicensed band cell is activated from the subframe #(n+1+$N_{Act}$), the UE may not receive the PDSCH included in the subframe #(n+1) of the unlicensed band cell scheduled by the PDDCH (or, EPDCCH). Therefore, the UE may transmit the HARQ response (e.g., NACK, DTX) indicating a reception failure of the PDSCH included in the subframe #(n+1) of the unlicensed band cell to the base station in a subframe #(n+5) of the licensed band cell. Alternatively, the UE may transmit the HARQ response (e.g., ACK) indicating a reception success of the PDCCH (or, EPDCCH) included in the subframe #(n+1) of the licensed band cell to the base station in the subframe #(n+5) of the licensed band cell.

When the HARQ response (e.g., ACK, NACK, DTX) is received in the subframe #(n+5) of the licensed band cell, the base station may determine that the UE activates the unlicensed band cell. In this case, the base station may perform the scheduling operation for downlink resources (e.g., PDSCH) of the unlicensed band cell from a subframe #(n+5+m). The m may be set based on capability of the base station (e.g., decoding capability of the HARQ response). For example, the m may be 2.

On the other hand, when the HARQ response is not received in the subframe #(n+5) of the licensed band cell, the base station may determine that the UE does not activate the unlicensed band cell. In this case, the base station may re-request the activation of the unlicensed band cell to the UE based on above-described activation method of the unlicensed band cell. The base station may perform the scheduling operation for downlink resources (or, uplink resources) of the unlicensed band cell based on pre-defined operation policies until a reception of the HARQ response.

The UE may activate the unlicensed band cell from the subframe #(n+1+$N_{Act}$). For example, when the $N_{Act}$ is 4, the UE may activate the unlicensed band cell from the subframe #(n+5). That is, the activation timer may be operated from the subframe #(n+5) of the unlicensed band cell. From the subframe #(n+5) of the unlicensed band cell, the UE may receive the PDCCH (or, EPDCCH) by monitoring the common search space or the UE-specific search space. For example, the UE may receive the PDCCH (or, EPDCCH) in a subframe #(n+7) of the unlicensed band cell. The UE may obtain the scheduling information from the PDCCH (or, EPDCCH) by performing the descrambling operation based on the C-RNTI. The UE may receive the PDCSH in the subframe #(n+7) of the unlicensed band cell indicated by the scheduling information. The UE may obtain data from the PDSCH by performing the descrambling operation based on the C-RNTI. Also, the UE may transmit the PUSCH through uplink resources indicated by the scheduling information.

Meanwhile, for the deactivation of the unlicensed band cell, the base station may transmit the PDDCH (or, EPDCCH) including information for requesting the deactivation of the unlicensed band cell (hereafter, "deactivation request information") in a subframe #(n+11) of the licensed band cell (or, unlicensed band cell). The CRC of the PDDCH (or, EPDCCH) including the deactivation request information may be masked (or, scrambled) based on the C-RNTI. The deactivation request information may be at least one of the activation/deactivation MAC CE requesting the deactivation of the unlicensed band cell and information which does not indicate specific meaning (e.g., RB information which is set to all zero) among information included in the DCI.

The UE may receive the PDCCH (or, EPDCCH) in the subframe #(n+11) of the licensed band cell. The UE may obtain the deactivation request information included in the PDCCH (or, EPDCCH) by performing the descrambling operation based on the C-RNTI. That is, by identifying the deactivation request information included in the PDCCH (or, EPDCCH), the UE may determine that the deactivation of the unlicensed band cell is requested from a subframe #(n+11+$N_{Dact}$).

The $N_{Dact}$ is an integer equal to or more than 1. For example, the $N_{Dact}$ is 2, 4, 8, etc. The $N_{Dact}$ may be pre-set in the base station and the UE. Alternatively, the $N_{Dact}$ may be transmitted to the UE through the RRC signaling. Alternatively, the DCI may include a new field indicating the $N_{Dact}$, and the DCI may be transmitted to the UE through the PDCCH (or, EPDCCH). Alternatively, the $N_{Dact}$ may be set based on the UE capabilities (e.g., receiving/decoding capability). In this case, the $N_{Dact}$ may be transmitted through the report procedure of the UE capability information (or, the transmission procedure of the response of the RRC signaling related to the unlicensed band cell).

The UE may deactivate the unlicensed band cell from the subframe #(n+11+$N_{Dact}$). For example, when the $N_{Dact}$ is 2, the UE may deactivate the unlicensed band cell from a subframe #(n+13). That is, the UE may not perform the monitoring operation on the common search space or the UE-specific search space from the subframe #(n+13).

Figure 13:
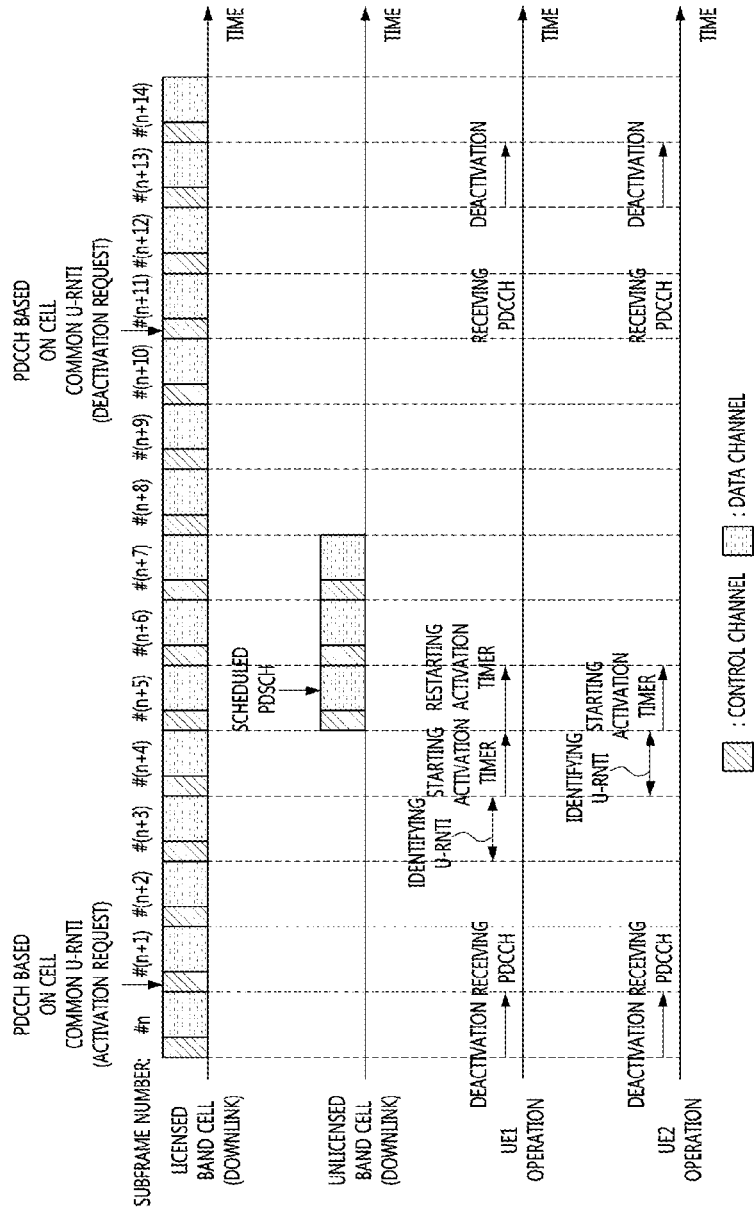
FIG. 13 is a timing diagram illustrating a second embodiment of an activation method of an unlicensed band cell.

FIG. 13 is a timing diagram illustrating a second embodiment of an activation method of an unlicensed band cell.

Referring to FIG. 13, the base station, a UE1, and a UE2 may configure the wireless communication network above-described by FIGS. 1 to 4, and support the licensed and unlicensed bands. The base station may support the carrier aggregation. The base station, the UE1, and the UE2 may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information for the unlicensed band cell in a subframe #(n+1) of the licensed band cell (or, other unlicensed band cell which is in the activation state). The PDCCH (or, EPDCCH) may be transmitted in the common search space or the CCE (or, ECCE) of the UE-specific search space indicated by the unlicensed band cell common U-RNTI. The CRC of the PDCCH (or, EPDCCH) including the activation request information may be masked (e.g., scrambled) based on the unlicensed band cell common U-RNTI. Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12.

The UE1 and the UE2 may receive the PDCCH (or, EPDCCH) in a subframe #(n+1) of the licensed band cell. The UE1 and the UE2 may obtain the activation request information included in the PDCCH (or, EPDCCH) by performing the descrambling operation based on the unlicensed band cell U-RNTI. That is, by identifying the activation request information included in the PDCCH (or, EPDCCH), the UE1 and the UE2 may determine that the activation of the unlicensed band cell is requested. For example, the UE1 and the UE2 may determine that the activation of the unlicensed band cell indicated by the CIF included in the DCI is requested. Alternatively, the UE1 and the UE2 may determine that the activation of the unlicensed band cell is requested based on the activation/deactivation MAC CE. The UE1 and the UE2 may activate the unlicensed band cell based on the decoding capability of the PDCCH (or, EPDCCH). For example, the UE1 may activate the unlicensed band cell from a subframe #(n+4). The UE2 may activate the unlicensed band cell from a subframe #(n+5).

Meanwhile, the UE1 and the UE2 may not receive the PDSCH included in the subframe #(n+1) of the unlicensed band cell scheduled by the PDDCH (or, EPDCCH). Therefore, the UE1 and the UE2 may transmit the HARQ response (e.g., NACK, DTX) indicating the reception failure of the PDSCH included in the subframe #(n+1) of the unlicensed band cell to the base station in the subframe #(n+5) of the licensed band cell. Alternatively, the UE1 and the UE2 may transmit the HARQ response (e.g., ACK) indicating the reception success of the PDCCH (or, EPDCCH) included in the subframe #(n+1) of the licensed band cell to the base station in the subframe #(n+5) of the licensed band cell. When the HARQ response (e.g., ACK, NACK, DTX) is received in the subframe #(n+5) of the licensed band cell, the base station may determine that the UE1 and the UE2 activate the unlicensed band cell.

On the other hand, when the HARQ response is not received in the subframe #(n+5) of the licensed band cell, the base station may determine that the UE1 and the UE2 do not activate the unlicensed band cell. In this case, the base station may re-request the activation of the unlicensed band cell to the UE1 and the UE2 based on above-described activation method of the unlicensed band cell. The base station may perform the scheduling operation for downlink resources (or, uplink resources) of the unlicensed band cell based on pre-defined operation policies until the reception of the HARQ response. When the PDDCH (or, EPDCCH) including the activation request information is transmitted in the common search space, the UE1 and the UE2 may not transmit the HARQ response to the base station.

The base station may perform the downlink transmission from a subframe #(n+1+$N_{Act}$) of the unlicensed band cell. The $N_{Act}$ may be identical to the $N_{Act}$ above-described by FIG. 12. When the $N_{Act}$ is 4, the base station may transmit the PDCCH (or, EPDCCH) and the PDSCH scheduled by the PDCCH (or, EPDCCH) in a subframe #(n+5) of the unlicensed band cell. The CRC of the PDCCH (or, EPDCCH) may be masked (e.g., scrambled) based on the C-RNTI (or, unlicensed band cell common U-RNTI). In the subframe #(n+5) of the unlicensed band cell, the UE1 and the UE2 may receive the PDCCH (or, EPDCCH) by monitoring the common search space or the UE-specific search space. The UE1 and the UE2 may obtain the scheduling information from the PDCCH (or, EPDCCH) by performing the descrambling operation based on the C-RNTI (or, unlicensed band cell common U-RNTI). The UE1 and the UE2 may receive the PDSCH in the subframe #(n+5) of the unlicensed band cell indicated by the scheduling information. The UE1 and the UE2 may obtain data from the PDSCH by performing the descrambling operation based on the C-RNTI (or, unlicensed band cell common U-RNTI). Also, the UE1 and the UE2 may transmit the PUSCH through uplink resources indicated by the scheduling information.

Also, when the PDSCH is received in the subframe #(n+5) of the unlicensed band cell, the UE1 and the UE2 may transmit the HARQ response (e.g., ACK) indicating the reception success of the PDSCH to the base station in a subframe #(n+9) of the licensed band cell. Alternatively, when the PDSCH is not received in the subframe #(n+5) of the unlicensed band cell, the UE1 and the UE2 may transmit the HARQ response (e.g., NACK, DTX) indicating the reception failure of the PDSCH to the base station in the subframe #(n+9) of the licensed band cell. When the HARQ response (e.g., ACK, NACK, DTX) is received in the subframe #(n+9) of the licensed band cell, the base station may determine that the UE1 and the UE2 activate the unlicensed band cell.

On the other hand, when the HARQ response (e.g., ACK, NACK, DTX) is not received in the subframe #(n+9) of the licensed band cell, the base station may determine that the UE1 and the UE2 do not activate the unlicensed band cell. In this case, the base station may re-request the activation of the unlicensed band cell to the UE1 and the UE2 based on above-described activation method of the unlicensed band cell.

Meanwhile, for the deactivation of the unlicensed band cell, the base station may transmit the PDDCH (or, EPDCCH) including the deactivation request information in a subframe #(n+11) of the licensed band cell (or, unlicensed band cell). The CRC of the PDDCH (or, EPDCCH) including the deactivation request information may be masked (or, scrambled) based on the unlicensed band cell U-RNTI. The deactivation request information may be at least one of the activation/deactivation MAC CE requesting the deactivation of the unlicensed band cell and information which does not indicate specific meaning (e.g., RB information which is set to all zero) among information included in the DCI.

The UE1 and the UE2 may receive the PDCCH (or, EPDCCH) in the subframe #(n+11) of the licensed band cell.

The UE1 and the UE2 may obtain the deactivation request information included in the PDCCH (or, EPDCCH) by performing the descrambling operation based on the unlicensed band cell U-RNTI. That is, by identifying the deactivation request information included in the PDCCH (or, EPDCCH), the UE1 and the UE2 may determine that the deactivation of the unlicensed band cell is requested from a subframe #(n+11+$N_{Dact}$). The $N_{Dact}$ may be identical to the $N_{Dact}$ above-described by FIG. 12.

The UE1 and the UE2 may deactivate the unlicensed band cell from the subframe #(n+11+$N_{Dact}$). For example, when the $N_{Dact}$ is 2, the UE1 and the UE2 may deactivate the unlicensed band cell from a subframe #(n+13). That is, the UE1 and the UE2 may not perform the monitoring operation on the common search space or the UE-specific search space from the subframe #(n+13).

Figure 14:
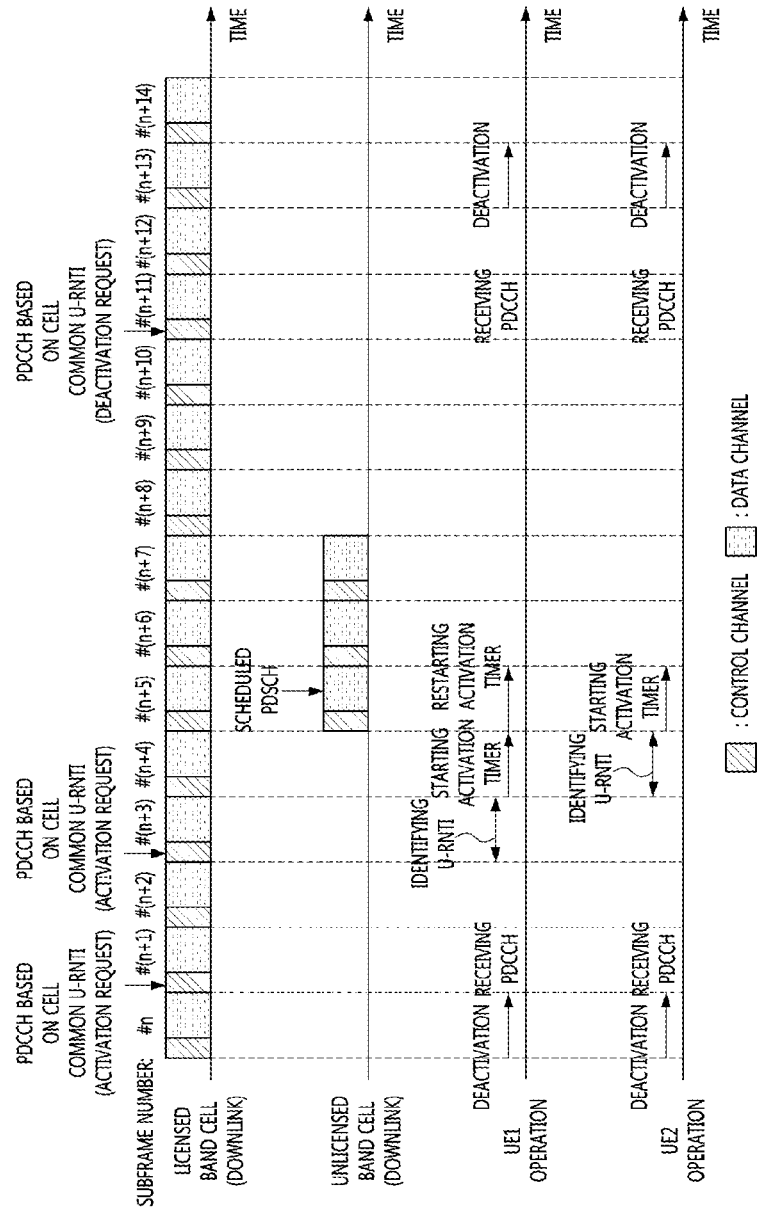
FIG. 14 is a timing diagram illustrating a third embodiment of an activation method of an unlicensed band cell.

FIG. 14 is a timing diagram illustrating a third embodiment of an activation method of an unlicensed band cell.

Referring to FIG. 14, the base station, the UE1, and the UE2 may configure the wireless communication network above-described by FIGS. 1 to 4, and support the licensed and unlicensed bands. The base station may support the carrier aggregation. The base station, the UE1, and the UE2 may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information for the unlicensed band cell in a subframe #(n+1) of the licensed band cell (or, other unlicensed band cell which is in the activation state). The PDCCH (or, EPDCCH) may be transmitted in the common search space or the CCE (or, ECCE) of the UE-specific search space indicated by the unlicensed band cell common U-RNTI. The CRC of the PDCCH (or, EPDCCH) including the activation request information may be masked (e.g., scrambled) based on the unlicensed band cell common U-RNTI. Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12.

Also, because there is the UE which does not receive the PDCCH (or, EPDCCH) transmitted in the subframe #(n+1) of the licensed band cell (or, other unlicensed band cell which is in the activation state), the base station may re-transmit the PDCCH (or, EPDCCH) including the activation request information in a subframe #(n+3) of the licensed band cell (or, other unlicensed band cell which is in the activation state). The PDCCH (or, EPDCCH) may be re-transmitted prior to a subframe #(n+1+$N_{Act}$). The PDCCH (or, EPDCCH) which is re-transmitted in the subframe #(n+3) may be identical to the PDCCH (or, EPDCCH) which has been re-transmitted in the subframe #(n+1).

After the transmission of the PDCCH (or, EPDCCH) including the activation request information of the unlicensed band cell, operations of the base station, the UE1, and the UE2 may be identical to operations of the base station, the UE1, and the UE2 above-described by FIG. 13. That is, when the retransmission operation of the PDCCH (or, EPDCCH) including the activation request information is omitted in the subframe #(n+3) of the licensed band cell, the timing diagram illustrated by FIG. 14 may identical to the timing diagram illustrated by FIG. 13.

Figure 15:
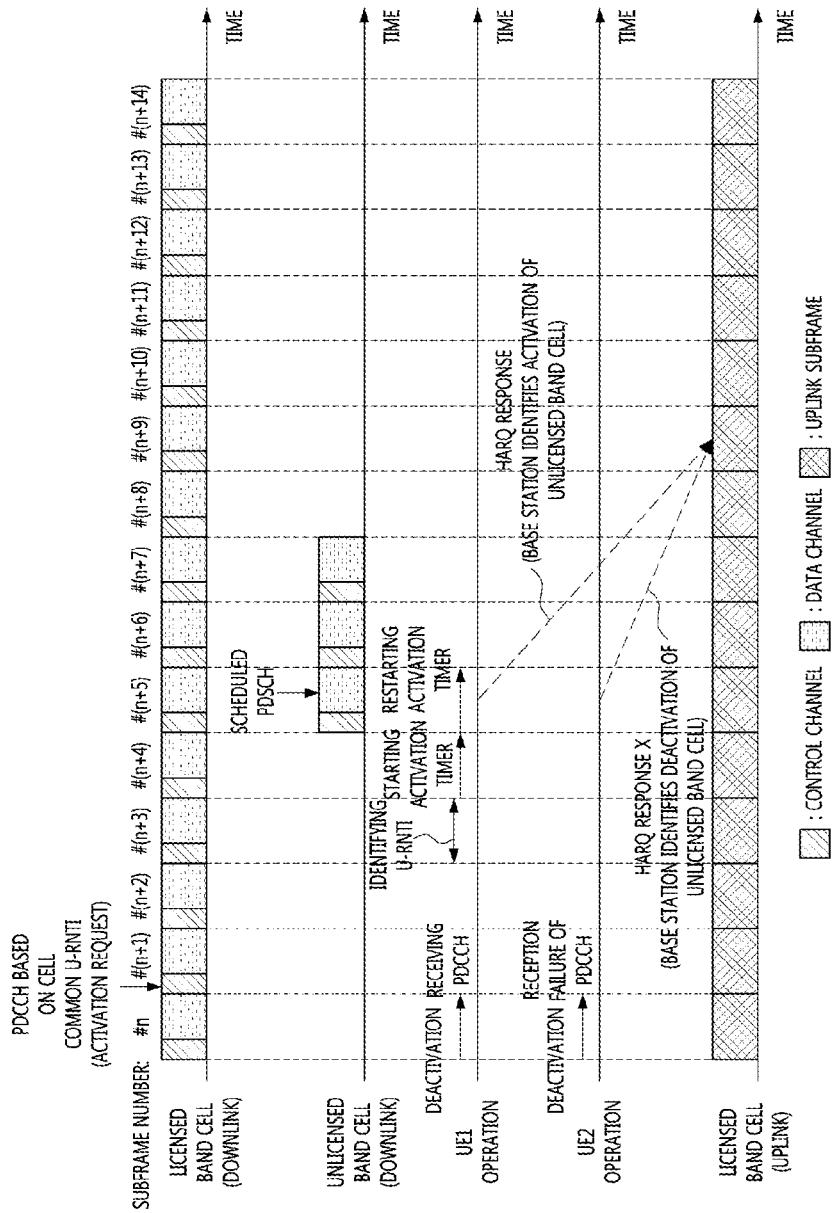
FIG. 15 is a timing diagram illustrating a fourth embodiment of an activation method of an unlicensed band cell.

FIG. 15 is a timing diagram illustrating a fourth embodiment of an activation method of an unlicensed band cell.

Referring to FIG. 15, the base station, the UE1, and the UE2 may configure the wireless communication network above-described by FIGS. 1 to 4, and support the licensed and unlicensed bands. The base station may support the carrier aggregation. The base station, the UE1, and the UE2 may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information for the unlicensed band cell in a subframe #(n+1) of the licensed band cell (or, other unlicensed band cell which is in the activation state). The PDCCH (or, EPDCCH) may be transmitted in the common search space or the CCE (or, ECCE) of the UE-specific search space indicated by the unlicensed band cell common U-RNTI. The CRC of the PDCCH (or, EPDCCH) including the activation request information may be masked (e.g., scrambled) based on the unlicensed band cell common U-RNTI. Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12.

The UE1 may receive the PDCCH (or, EPDCCH) in the subframe #(n+1) of the licensed band cell. The UE1 may obtain the activation request information included in the PDCCH (or, EPDCCH) by performing the descrambling operation based on the unlicensed band cell common U-RNTI. That is, by identifying the activation request information included in the PDCCH (or, EPDCCH), the UE1 may determine that the activation of the unlicensed band cell is requested. For example, the UE1 may determine that the activation of the unlicensed band cell indicated by the CIF included in the DCI is requested. Alternatively, the UE1 may determine that the activation of the unlicensed band cell is requested based on the activation/deactivation MAC CE. Therefore, the UE1 may activate the unlicensed band cell from a subframe #(n+4).

On the other hand, the UE2 may not receive the PDCCH (or, EPDCCH) in the subframe #(n+1) of the licensed band cell. In this case, the UE2 may not identify that the activation of the unlicensed band cell is request. Therefore, the UE2 may not activate the unlicensed band cell.

Meanwhile, the base station may perform the downlink transmission from a subframe #(n+1+$N_{Act}$) of the unlicensed band cell. The $N_{Act}$ may be identical to the $N_{Act}$ above-described by FIG. 12. When the $N_{Act}$ is 4, the base station may transmit the PDCCH (or, EPDCCH) and the PDSCH scheduled by the PDCCH (or, EPDCCH) in a subframe #(n+5) of the unlicensed band cell. The CRC of the PDCCH (or, EPDCCH) may be masked (e.g., scrambled) based on the C-RNTI (or, unlicensed band cell common U-RNTI). In the subframe #(n+5) of the unlicensed band cell, the UE1 may receive the PDCCH (or, EPDCCH) by monitoring the common search space or the UE-specific search space. The UE1 may obtain the scheduling information from the PDCCH (or, EPDCCH) by performing the descrambling operation based on the C-RNTI (or, unlicensed band cell common U-RNTI). The UE1 may receive the PDSCH in the subframe #(n+5) of the unlicensed band cell indicated by the scheduling information. The UE1 may obtain data from the PDSCH by performing the descrambling operation based on the C-RNTI (or, unlicensed band cell common U-RNTI). Also, the UE1 may transmit the PUSCH through uplink resources indicated by the scheduling information.

Also, when the PDSCH is received in the subframe #(n+5) of the unlicensed band cell, the UE1 may transmit the HARQ response (e.g., ACK) indicating the reception success of the PDSCH to the base station in a subframe #(n+9) of the licensed band cell. Alternatively, when the PDSCH is not received in the subframe #(n+5) of the unlicensed band cell, the UE1 may transmit the HARQ response (e.g., NACK, DTX) indicating the reception failure of the PDSCH to the base station in the subframe #(n+9) of the licensed band cell. When the HARQ response (e.g., ACK, NACK, DTX) is received in the subframe #(n+9) of the licensed band cell, the base station may determine that the UE1 activates the unlicensed band cell.

On the other hand, because the state of the unlicensed band cell is the deactivation state, the UE2 may not receive the PDCCH (or, EPDCCH) and the PDSCH in the subframe #(n+5) of the unlicensed band cell. Therefore, the UE2 may not transmit the HARQ response (e.g., ACK, NACK, DTX) in response to the PDSCH to the base station in the subframe #(n+9) of the licensed band cell. Because the HARQ response is not received in the subframe #(n+9) of the licensed band cell, the base station may determine that the UE2 does not activate the unlicensed band cell. Therefore, the base station may re-request the activation of the unlicensed band cell to the UE2 based on above-described activation method of the unlicensed band cell.

Figure 16:
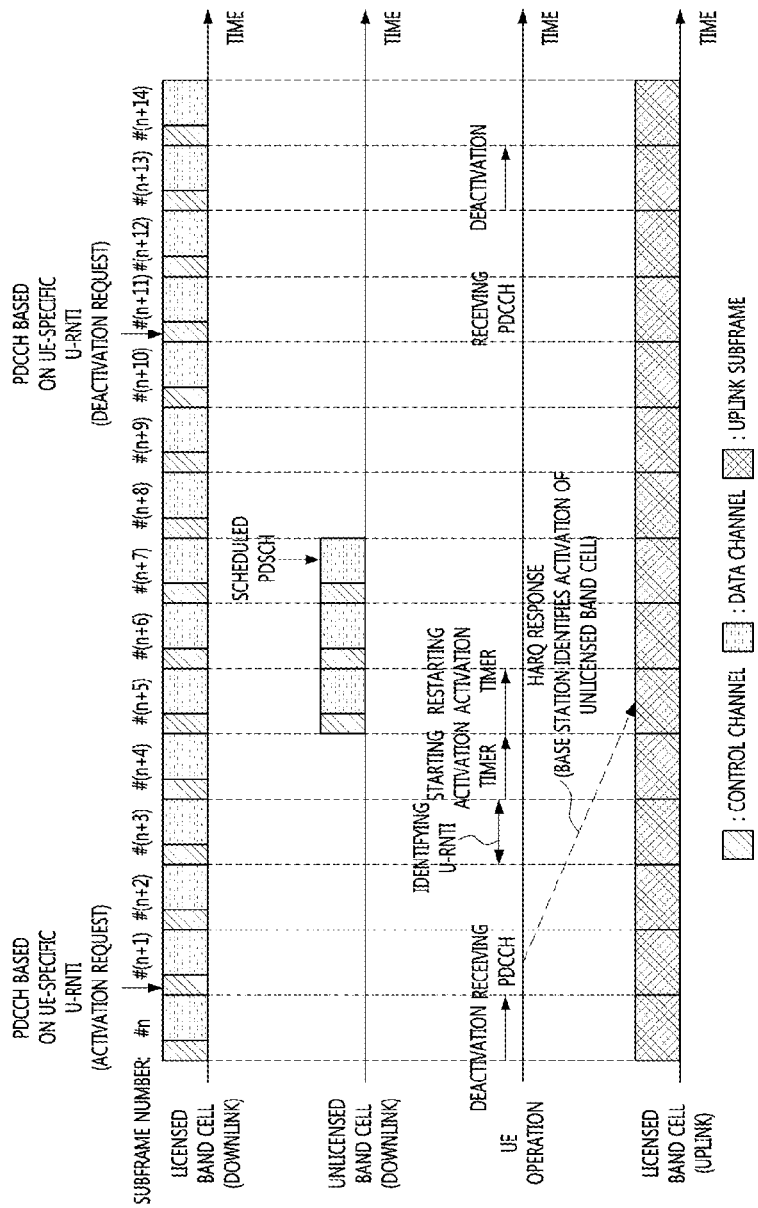
FIG. 16 is a timing diagram illustrating a fifth embodiment of an activation method of an unlicensed band cell.

FIG. 16 is a timing diagram illustrating a fifth embodiment of an activation method of an unlicensed band cell.

Referring to FIG. 16, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information for the unlicensed band cell in a subframe #(n+1) of the licensed band cell (or, other unlicensed band cell which is in the activation state). The CRC of the PDCCH (or, EPDCCH) including the activation request information may be masked (e.g., scrambled) based on the UE-specific U-RNTI (or, activation U-RNTI). Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12.

The UE may receive the PDCCH (or, EPDCCH) in the subframe #(n+1) of the licensed band cell. The UE may obtain the activation request information included in the PDCCH (or, EPDCCH) by performing the descrambling operation based on the UE-specific U-RNTI (or, activation U-RNTI). That is, by identifying the activation request information included in the PDCCH (or, EPDCCH), the UE may determine that the activation of the unlicensed band cell is requested from a subframe #(n+1+$N_{Act}$). The $N_{Act}$ may be identical to the $N_{Act}$ above-described by FIG. 12. For example, the UE may determine that the activation of the unlicensed band cell indicated by the CIF included in the DCI is requested. Alternatively, the UE may determine that the activation of the unlicensed band cell is requested based on the activation/deactivation MAC CE.

Meanwhile, because the unlicensed band cell is activated from the subframe #(n+1+$N_{Act}$), the UE may not receive the PDSCH included in the subframe #(n+1) of the unlicensed band cell scheduled by the PDDCH (or, EPDCCH). Therefore, the UE may transmit the HARQ response (e.g., NACK, DTX) indicating the reception failure of the PDSCH included in the subframe #(n+1) of the unlicensed band cell to the base station in a subframe #(n+5) of the licensed band cell. Alternatively, the UE may transmit the HARQ response (e.g., ACK) indicating the reception success of the PDCCH (or, EPDCCH) included in the subframe #(n+1) of the licensed band cell to the base station in the subframe #(n+5) of the licensed band cell.

When the HARQ response (e.g., ACK, NACK, DTX) is received in the subframe #(n+5) of the licensed band cell, the base station may determine that the UE activates the unlicensed band cell. In this case, the base station may perform the scheduling operation for downlink resources (e.g., PDSCH) of the unlicensed band cell from a subframe #(n+5+m). The m may be set based on capability of the base station (e.g., decoding capability of the HARQ response). For example, the m may be 2.

On the other hand, when the HARQ response is not received in the subframe #(n+5) of the licensed band cell, the base station may determine that the UE does not activate the unlicensed band cell. In this case, the base station may re-request the activation of the unlicensed band cell to the UE based on above-described activation method of the unlicensed band cell. The base station may perform the scheduling operation for downlink resources (or, uplink resources) of the unlicensed band cell based on pre-defined operation policies until a reception of the HARQ response.

The UE may activate the unlicensed band cell from a subframe #(n+1+$N_{Act}$). For example, when the $N_{Act}$ is 4, the UE may activate the unlicensed band cell from the subframe #(n+5). That is, the activation timer may be operated from the subframe #(n+5) of the unlicensed band cell. From the subframe #(n+5) of the unlicensed band cell, the UE may receive the PDCCH (or, EPDCCH) by monitoring the common search space or the UE-specific search space. For example, the UE may receive the PDCCH (or, EPDCCH) in a subframe #(n+7) of the unlicensed band cell. The UE may obtain the scheduling information from the PDCCH (or, EPDCCH) by performing the descrambling operation based on the UE-specific U-RNTI (or, activation U-RNTI). The UE may receive the PDCSH in the subframe #(n+7) of the unlicensed band cell indicated by the scheduling information. The UE may obtain data from the PDSCH by performing the descrambling operation based on the UE-specific U-RNTI (or, activation U-RNTI). Also, the UE may transmit the PUSCH through uplink resources indicated by the scheduling information.

Meanwhile, for the deactivation of the unlicensed band cell, the base station may transmit the PDDCH (or, EPDCCH) including the deactivation request information in a subframe #(n+11) of the licensed band cell (or, unlicensed band cell). The CRC of the PDDCH (or, EPDCCH) including the deactivation request information may be masked (or, scrambled) based on the UE-specific U-RNTI (or, deactivation U-RNTI). The deactivation request information may be at least one of the activation/deactivation MAC CE requesting the deactivation of the unlicensed band cell and information which does not indicate specific meaning (e.g., RB information which is set to all zero) among information included in the DCI.

The UE may receive the PDCCH (or, EPDCCH) in the subframe #(n+11) of the licensed band cell. The UE may obtain the deactivation request information included in the PDCCH (or, EPDCCH) by performing the descrambling operation based on the UE-specific U-RNTI (or, deactivation U-RNTI). That is, by identifying the deactivation request information included in the PDCCH (or, EPDCCH), the UE may determine that the deactivation of the unlicensed band cell is requested from a subframe #(n+11+$N_{Dact}$). The $N_{Dact}$ may be identical to the $N_{Dact}$ above-described by FIG. 12.

The UE may deactivate the unlicensed band cell from the subframe #(n+11+$N_{Dact}$). For example, when the $N_{Dact}$ is 2, the UE may deactivate the unlicensed band cell from a subframe #(n+13). That is, the UE may not perform the monitoring operation on the common search space or the UE-specific search space from the subframe #(n+13).

Figure 17:
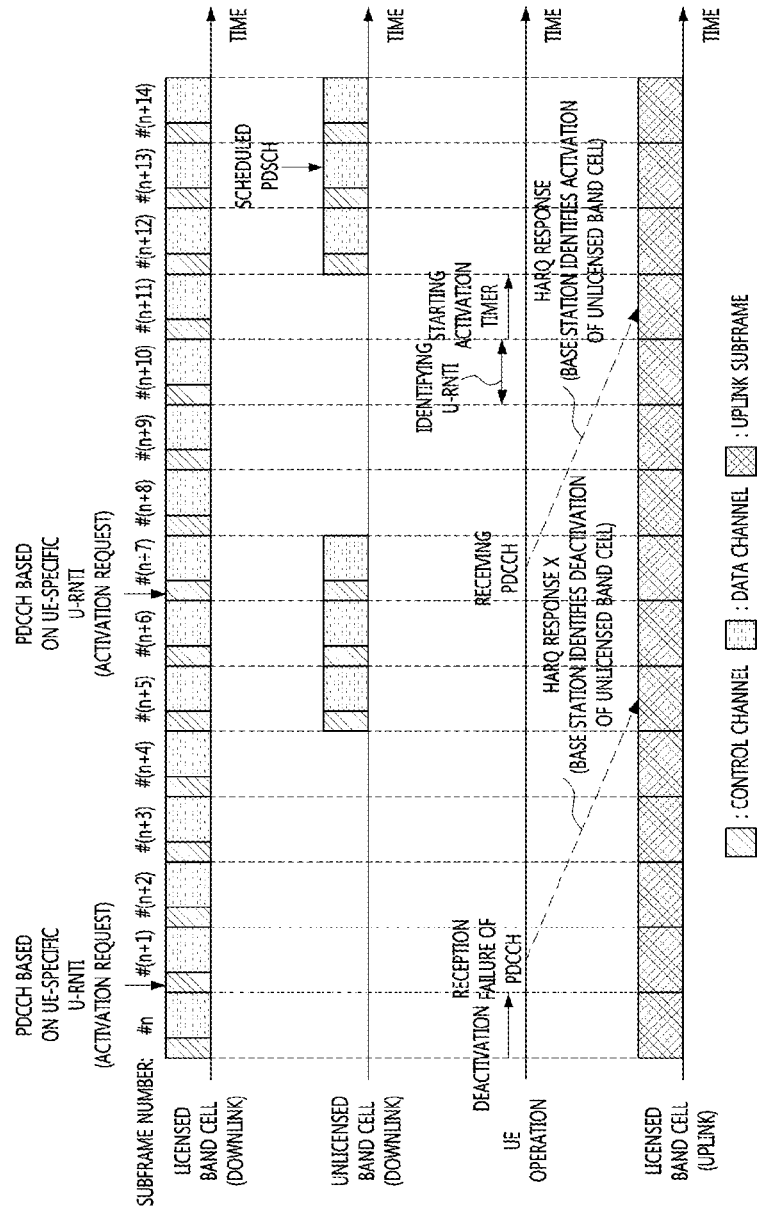
FIG. 17 is a timing diagram illustrating a sixth embodiment of an activation method of an unlicensed band cell.

FIG. 17 is a timing diagram illustrating a sixth embodiment of an activation method of an unlicensed band cell.

Referring to FIG. 17, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information for the unlicensed band cell in a subframe #(n+1) of the licensed band cell (or, other unlicensed band cell which is in the activation state). The CRC of the PDCCH (or, EPDCCH) including the activation request information may be masked (e.g., scrambled) based on the UE-specific U-RNTI (or, activation U-RNTI). Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12.

The UE may not receive the PDCCH (or, EPDCCH) in the subframe #(n+1) of the licensed band cell. In this case, the UE may not transmit the HARQ response in response to the PDCCH (or, EPDCCH) or the HARQ response in response to the PDSCH scheduled by the PDCCH (or, EPDCCH) to the base station. When the HARQ response of the subframe #(n+1) of the licensed band cell is not received in a subframe #(n+5) of the licensed band cell, the base station may determine that the UE does not activate the unlicensed band cell. In this case, the base station may re-transmit the PDCCH (or, EPDCCH) including the activation request information for the unlicensed band cell in a subframe #(n+7) of the licensed band cell (or, other unlicensed band cell which is in the activation state). The CRC of the PDCCH (or, EPDCCH) including the activation request information may be masked (e.g., scrambled) based on the UE-specific U-RNTI (or, activation U-RNTI). The PDCCH (or, EPDCCH) which is re-transmitted in the subframe #(n+7) may be identical to the PDCCH (or, EPDCCH) which has been transmitted in the subframe #(n+1).

The UE may receive the PDCCH (or, EPDCCH) in the subframe #(n+7) of the licensed band cell. The UE may obtain the activation request information included in the PDCCH (or, EPDCCH) by performing the descrambling operation based on the UE-specific U-RNTI (or, activation U-RNTI). That is, by identifying the activation request information included in the PDCCH (or, EPDCCH), the UE may determine that the activation of the unlicensed band cell is requested from a subframe #(n+7+$N_{Act}$). The $N_{Act}$ may be identical to the $N_{Act}$ above-described by FIG. 12. For example, the UE may determine that the activation of the unlicensed band cell indicated by the CIF included in the DCI is requested. Alternatively, the UE may determine that the activation of the unlicensed band cell is requested based on the activation/deactivation MAC CE.

Meanwhile, because the unlicensed band cell is activated from the subframe #(n+7+$N_{Act}$), the UE may not receive the PDSCH included in the subframe #(n+7) of the unlicensed band cell scheduled by the PDDCH (or, EPDCCH). Therefore, the UE may transmit the HARQ response (e.g., NACK, DTX) indicating the reception failure of the PDSCH included in the subframe #(n+7) of the unlicensed band cell to the base station in a subframe #(n+11) of the licensed band cell. Alternatively, the UE may transmit the HARQ response (e.g., ACK) indicating the reception success of the PDCCH (or, EPDCCH) included in the subframe #(n+7) of the licensed band cell to the base station in the subframe #(n+11) of the licensed band cell.

When the HARQ response (e.g., ACK, NACK, DTX) is received in the subframe #(n+11) of the licensed band cell, the base station may determine that the UE activates the unlicensed band cell. In this case, the base station may perform the scheduling operation for downlink resources (e.g., PDSCH) of the unlicensed band cell from a subframe #(n+11+m). The m may be set based on capability of the base station (e.g., decoding capability of the HARQ response). For example, the m may be 2.

The UE may activate the unlicensed band cell from a subframe #(n+7+$N_{Act}$). For example, when the $N_{Act}$ is 4, the UE may activate the unlicensed band cell from the subframe #(n+11). That is, the activation timer may be operated from the subframe #(n+11) of the unlicensed band cell. From the subframe #(n+11) of the unlicensed band cell, the UE may receive the PDCCH (or, EPDCCH) by monitoring the common search space or the UE-specific search space. For example, the UE may receive the PDCCH (or, EPDCCH) in a subframe #(n+13) of the unlicensed band cell. The UE may obtain the scheduling information from the PDCCH (or, EPDCCH) by performing the descrambling operation based on the UE-specific U-RNTI (or, activation U-RNTI). The UE may receive the PDCSH in the subframe #(n+13) of the unlicensed band cell indicated by the scheduling information. The UE may obtain data from the PDSCH by performing the descrambling operation based on the UE-specific U-RNTI (or, activation U-RNTI). Also, the UE may transmit the PUSCH through uplink resources indicated by the scheduling information.

Figure 18:
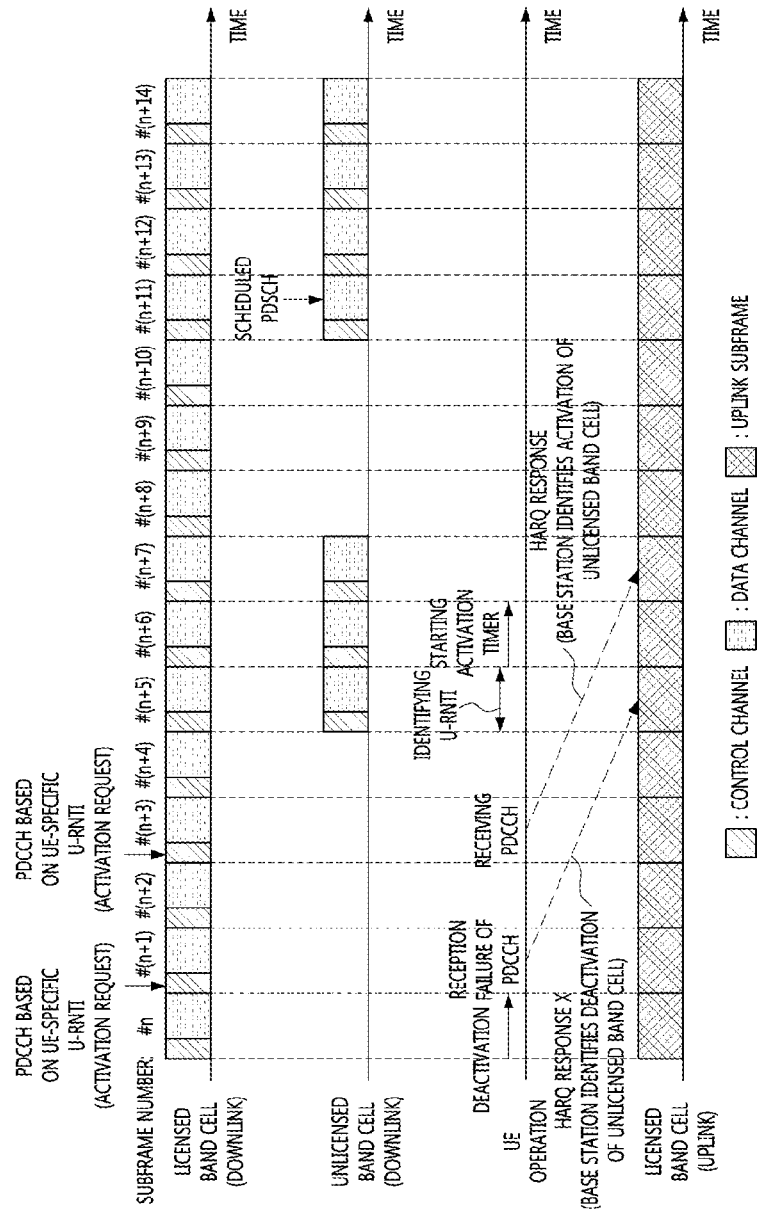
FIG. 18 is a timing diagram illustrating a seventh embodiment of an activation method of an unlicensed band cell.

FIG. 18 is a timing diagram illustrating a seventh embodiment of an activation method of an unlicensed band cell.

Referring to FIG. 18, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information in a subframe #(n+1) of the licensed band cell (or, other unlicensed band cell which is in the activation state). The PDCCH (or, EPDCCH) may be transmitted in the common search space or the CCE (or, ECCE) of the UE-specific search space indicated by the UE-specific U-RNTI (or, activation U-RNTI). The CRC of the PDCCH (or, EPDCCH) including the activation request information may be masked (e.g., scrambled) based on the UE-specific U-RNTI (or, activation U-RNTI). Also, the PDCCH (or, EPDCCH) may further include scheduling information for uplink resources of the unlicensed band cell (e.g., uplink grant), scheduling information for downlink resources of the unlicensed band cell, etc.

The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12.

Also, because there is the UE which does not receive the PDCCH (or, EPDCCH) transmitted in the subframe #(n+1) of the licensed band cell (or, other unlicensed band cell which is in the activation state), the base station may re-transmit the PDCCH (or, EPDCCH) including the activation request information in a subframe #(n+3) of the licensed band cell (or, other unlicensed band cell which is in the activation state). The PDCCH (or, EPDCCH) may be re-transmitted prior to a subframe #(n+1+$N_{Act}$). The PDCCH (or, EPDCCH) which is re-transmitted in the subframe #(n+3) may be identical to the PDCCH (or, EPDCCH) which has been re-transmitted in the subframe #(n+1).

The UE may not receive the PDCCH (or, EPDCCH) in the subframe #(n+1) of the licensed band cell. In this case, the UE may not transmit the HARQ response in response to the PDCCH (or, EPDCCH) or the HARQ response in response to the PDSCH scheduled by the PDCCH (or, EPDCCH) to the base station. When the HARQ response of the subframe #(n+1) of the licensed band cell is not received in a subframe #(n+5) of the licensed band cell, the base station may determine that the UE does not activate the unlicensed band cell.

Meanwhile, the UE may receive the PDCCH (or, EPDCCH) in the subframe #(n+3) of the licensed band cell. The UE may obtain the activation request information included in the PDCCH (or, EPDCCH) by performing the descrambling operation based on the UE-specific U-RNTI (or, activation U-RNTI). That is, by identifying the activation request information included in the PDCCH (or, EPDCCH), the UE may determine that the activation of the unlicensed band cell is requested. For example, the UE may determine that the activation of the unlicensed band cell indicated by the CIF included in the DCI is requested. Alternatively, the UE may determine that the activation of the unlicensed band cell is requested based on the activation/deactivation MAC CE.

Also, the UE may transmit the HARQ response (e.g., ACK) indicating the reception success of the PDCCH (or, EPDCCH) included in the subframe #(n+3) of the licensed band cell to the base station in a subframe #(n+7) of the licensed band cell. When the HARQ response is received in the subframe #(n+7) of the licensed band cell, the base station may determine that the UE activates the unlicensed band cell.

The UE may activate the unlicensed band cell from the subframe #(n+6). That is, the activation timer may be operated from a subframe #(n+6) of the unlicensed band cell. Meanwhile, the base station may transmit the PDCCH (or, EPDCCH) and the PDSCH scheduled by the PDCCH (or, EPDCCH) in a subframe #(n+11) of the unlicensed band cell. Because the state of the unlicensed band cell is the activation state, the UE may receive the PDCCH (or, EPDCCH) in the subframe #(n+11) of the unlicensed band cell, and obtain the scheduling information form the received PDCCH (or, EPDCCH). The UE may receive the PDSCH in the subframe #(n+11) of the unlicensed band cell indicated by the scheduling information.

Figure 19:
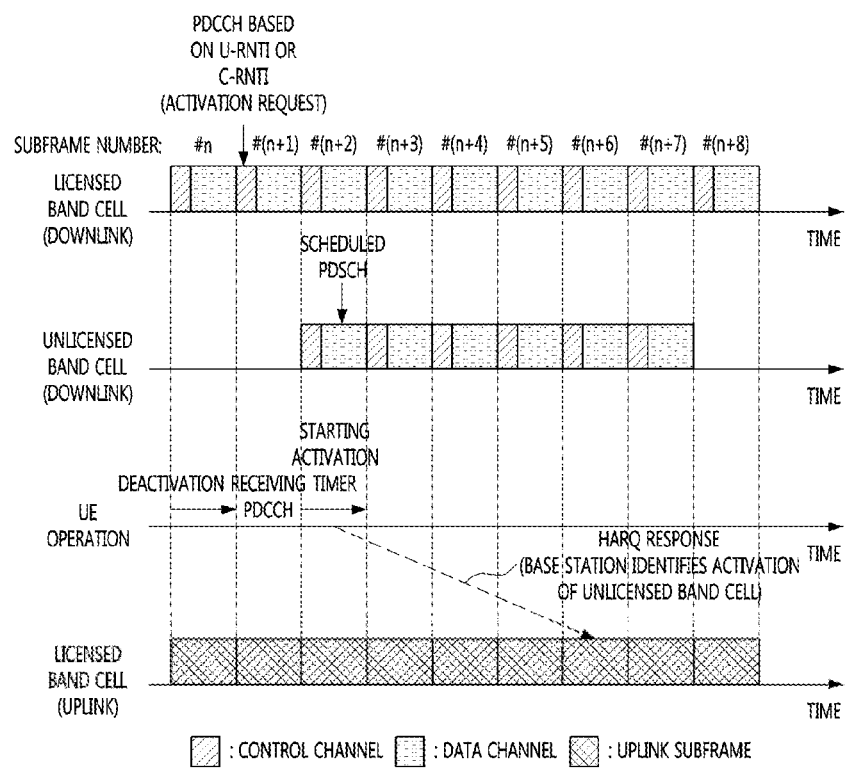
FIG. 19 is a timing diagram illustrating an eighth embodiment of an activation method of an unlicensed band cell.

FIG. 19 is a timing diagram illustrating an eighth embodiment of an activation method of an unlicensed band cell.

Referring to FIG. 19, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the PDCCH (or, EPDCCH) including the activation request information in a subframe #(n+1) of the licensed band cell (or, other unlicensed band cell which is in the activation state). The PDCCH (or, EPDCCH) may be transmitted in the common search space or the CCE (or, ECCE) of the UE-specific search space. The CRC of the PDCCH (or, EPDCCH) including the activation request information may be masked (e.g., scrambled) based on the UE-specific U-RNTI (or, activation U-RNTI, C-RNTI). The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12. The PDCCH (or, EPDCCH) may further include scheduling information for uplink resources of the unlicensed band cell (e.g., uplink grant), scheduling information for downlink resources of the unlicensed band cell, etc.

The UE may receive the PDCCH (or, EPDCCH) in the subframe #(n+1) of the licensed band cell. The UE may obtain the activation request information included in the PDCCH (or, EPDCCH) by performing the descrambling operation based on the UE-specific U-RNTI (or, activation U-RNTI, C-RNTI). That is, by identifying the activation request information included in the PDCCH (or, EPDCCH), the UE may determine that the activation of the unlicensed band cell is requested. For example, the UE may determine that the activation of the unlicensed band cell indicated by the CIF included in the DCI is requested. Alternatively, the UE may determine that the activation of the unlicensed band cell is requested based on the activation/deactivation MAC CE.

The descrambling operation of the PDCCH (or, EPDCCH) may be completed in a time (e.g., 1 ms) corresponding to a single subframe. In this case, the UE may activate the unlicensed band cell from a next subframe (i.e., subframe #(n+2)). That is, the activation timer may be operated from the subframe #(n+2) of the unlicensed band cell.

Meanwhile, the base station may transmit the PDCCH (or, EPDCCH) and the PDSCH scheduled by the PDCCH (or, EPDCCH) in the subframe #(n+2) of the unlicensed band cell. Because the state of the unlicensed band cell is the activation state, the UE may receive the PDCCH (or, EPDCCH) in the subframe #(n+2) of the unlicensed band cell, and obtain the scheduling information form the received PDCCH (or, EPDCCH). The UE may receive the PDSCH in the subframe #(n+2) of the unlicensed band cell indicated by the scheduling information.

When the PDSCH is received in the subframe #(n+2) of the unlicensed band cell, the UE may the HARQ response indicating the reception success of the PDSCH in a subframe #(n+6) of the licensed band cell. When the HARQ response is received in the subframe #(n+6) of the licensed band cell, the base station may determine that the UE activates the unlicensed band cell.

Meanwhile, for receiving the HARQ response in response to the PDCCH (or, EPDCCH) including the activation request information of the unlicensed band cell, a time corresponding to a plurality of subframes may be demanded. To resolve these problems, the PUCCH may be configured based on semi-static scheduling (SSS), the HARQ response in response to the PDCCH (or, EPDCCH) including the activation request information of the unlicensed band cell may be transmitted in the PUCCH based on SSS. Next, a method for activating the unlicensed band cell using the PUCCH based on SSS will be described.

Figure 20:
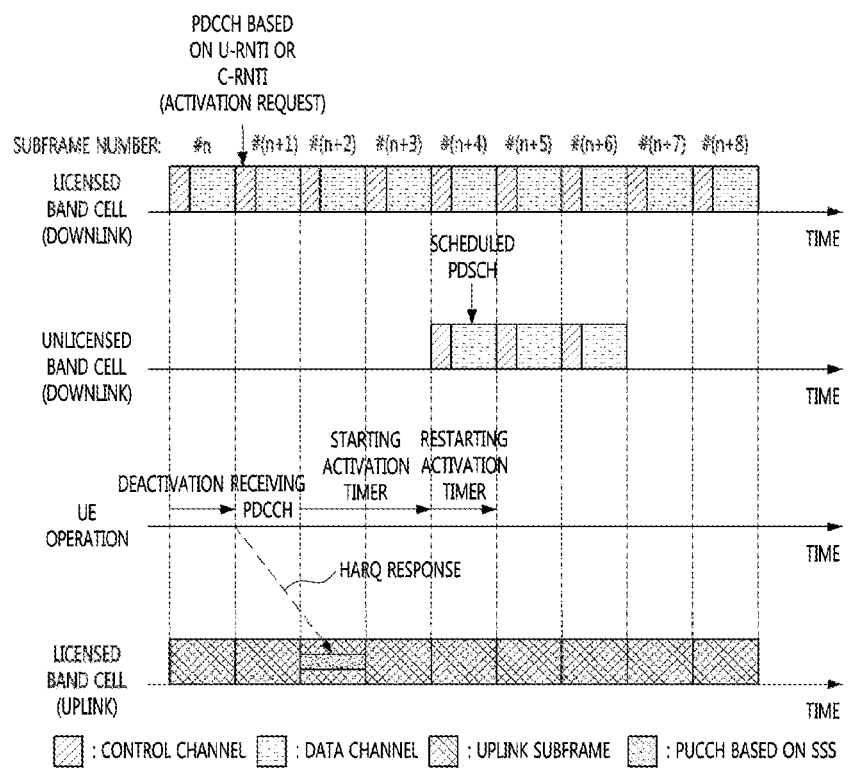
FIG. 20 is a timing diagram illustrating a ninth embodiment of an activation method of an unlicensed band cell.

FIG. 20 is a timing diagram illustrating a ninth embodiment of an activation method of an unlicensed band cell.

Referring to FIG. 20, the base station and the UE may configure the wireless communication network above-described by FIGS. 1 to 4, and support the licensed and unlicensed bands. The base station may support the carrier aggregation. The base station and the UE may be identical or similar to the communication node 500 above-described by FIG. 5. The timing of the subframe (or, slot, OFDM symbol, etc.) of the licensed band may be identical to the timing of the subframe (or, slot, OFDM symbol, etc.) of the unlicensed band. The configuration of the unlicensed band burst may be identical or similar to the configuration of the unlicensed band burst above-described by FIG. 9. The unlicensed band burst may be scheduled based on the cross carrier scheduling manner or the self-scheduling manner.

The base station may transmit the RRC message including information related to the PUCCH based on SSS to the UE. The information related to the PUCCH based on SSS may include subframe information indicating a subframe in which the PUCCH is configured, resource information indicating resources in which the PUCCH is configured (e.g., locations of frequency resources, locations of time resources), response information indicating the reception response which is transmitted in response to the PDCCH (or, EPDCCH) including the activation request information (e.g., bit value, sequence, HARQ response), etc. The subframe information may indicate the number of subframes ($N_{REP}$) between the subframe in which the PDCCH (or, EPDCCH) including the activation request information is configured and the subframe in which the PUCCH is configured. The $N_{RE}p$ may be an integer equal to or more than 1. The UE may obtain the information related to the PUCCH based on SSS by receiving the RRC message.

The base station may transmit the PDCCH (or, EPDCCH) including the activation request information of the unlicensed band cell in a subframe #(n+1) of the licensed band cell (or, other unlicensed band cell which is in the activation state). The PDCCH (or, EPDCCH) may be transmitted in the common search space or the CCE (or, ECCE) of the UE-specific search space. The CRC of the PDCCH (or, EPDCCH) including the activation request information may be masked (e.g., scrambled) based on the UE-specific U-RNTI (or, activation U-RNTI, C-RNTI). The activation request information may be at least one of information indicating the unlicensed band cell which is in the deactivation state (e.g., the CIF included in the DCI) and the activation/deactivation MAC CE requesting the activation of the unlicensed band cell. The activation/deactivation MAC CE may be identical to the activation/deactivation MAC CE above-described by FIG. 12. The PDCCH (or, EPDCCH) may further include scheduling information for uplink resources of the unlicensed band cell (e.g., uplink grant), scheduling information for downlink resources of the unlicensed band cell, etc.

The UE may receive the PDCCH (or, EPDCCH) in the subframe #(n+1) of the licensed band cell. The UE may obtain the activation request information included in the PDCCH (or, EPDCCH) by performing the descrambling operation based on the UE-specific U-RNTI (or, activation U-RNTI, C-RNTI). That is, by identifying the activation request information included in the PDCCH (or, EPDCCH), the UE may determine that the activation of the unlicensed band cell is requested. For example, the UE may determine that the activation of the unlicensed band cell indicated by the CIF included in the DCI is requested. Alternatively, the UE may determine that the activation of the unlicensed band cell is requested based on the activation/deactivation MAC CE.

The descrambling operation of the PDCCH (or, EPD-CCH) may be completed in a time (e.g., 1 ms) corresponding to a single subframe. In this case, the UE may activate the unlicensed band cell from a next subframe (i.e., subframe #(n+2)). That is, the activation timer may be operated from the subframe #(n+2) of the unlicensed band cell. Also, based on information related to the PUCCH based on SSS, the UE may determine that a subframe in which the PUCCH based on SSS is configured is the subframe #(n+2) (i.e., subframe after the subframe #(n+1) in which the PDCCH (or, EPD-CCH) including the activation request information is configured). Therefore, the UE may transmit the reception response of the PDCCH (or, EPDCCH) including the activation request information to the base station in the PUCCH based on SSS included in the subframe #(n+2) of the licensed band cell. When the reception response of the PDCCH (or, EPDCCH) including the activation request information is received in the PUCCH based on SSS included in the subframe #(n+2) of the licensed band cell, the base station may determine that the UE activates the unlicensed band cell.

Meanwhile, the base station may transmit the PDCCH (or, EPDCCH) and the PDSCH scheduled by the PDCCH (or, EPDCCH) in a subframe #(n+4) of the unlicensed band cell. Because the state of the unlicensed band cell is the activation state, the UE may receive the PDCCH (or, EPDCCH) in the subframe #(n+4) of the unlicensed band cell, and obtain the scheduling information form the received PDCCH (or, EPD-CCH). The UE may receive the PDSCH in the subframe #(n+4) of the unlicensed band cell indicated by the scheduling information.

Next, a scheduling method of the unlicensed band cell will be described.

When the self-scheduling manner is used, the scheduling information of the PDSCH included in a subframe # n of the unlicensed band cell may be transmitted through the PDCCH (or, EPDCCH) included in the subframe # n of the unlicensed band cell. When the cross carrier scheduling manner is used, the scheduling information of the PDSCH included in the subframe # n of the unlicensed band cell may be transmitted through the PDCCH (or, EPDCCH) included in the subframe # n of the licensed band cell which corresponds to the subframe # n of the unlicensed band cell.

The scheduling information (e.g., grant) of the PUSCH included in a subframe #(n+4) of the unlicensed band cell may be transmitted through the PDCCH (or, EPDCCH) included in the subframe # n of the licensed band cell or the unlicensed band cell. The scheduling information (e.g., grant) of the PUSCH included in the subframe #(n+4) of the unlicensed band cell may be included in the DCI (e.g., DCI with format 0). In this case, the UE may transmit the PUSCH through uplink resources included in the subframe #(n+4) of the unlicensed band cell indicated by the scheduling information. However, when the subframe #(n+4) of the unlicensed band cell is occupied by other communication node, the UE may transmit the PUSCH based on following methods.

In a first method, when the subframe #(n+4) of the unlicensed band cell is occupied by other communication node, the UE may abandon the transmission of the PUSCH in the subframe #(n+4) of the unlicensed band cell. In this case, for receiving the PDCCH (or, EPDCCH) including the DCI (e.g., DCI with format 0) including new scheduling information for the PUSCH, the UE may monitor the licensed band cell or the unlicensed band cell. When the PDCCH (or, EPDCCH) including the DCI (e.g., DCI with format 0) including new scheduling information for the PUSCH is received, the UE may transmit the PUSCH through uplink resources of unlicensed band cell indicated by the new scheduling information.

In a second method, the UE may identify channel status from the subframe #(n+4) to a subframe (n+4+$N_{UL\_Window}$) in the unlicensed band cell, and transmit the PUSCH through uplink resources of the unlicensed band cell when the channel status is an idle status. In this case, the UE may transmit the PUSCH based on the scheduling information which received in the subframe # n of the licensed band cell or the unlicensed band cell. The $N_{UL\_Window}$ may be pre-set in the base station and the UE. Alternatively, the $N_{UL\_Window}$ may be transmitted to the UE through the RRC message (e.g., RRC message which is newly defined for the unlicensed band cell). The $N_{UL\_Window}$ may be set to equal to or less than the maximum transmission duration or the maximum occupancy time. The $N_{UL\_Window}$ may be an integer equal to or more than 0. For example, when $N_{UL\_Window}$ may be 0, the UE may abandon the transmission of the PUSCH in the subframe #(n+4) of the unlicensed band cell when the subframe #(n+4) of the unlicensed band cell is occupied by other communication node. In this case, for receiving the PDCCH (or, EPDCCH) including the DCI (e.g., DCI with format 0) including the new scheduling information for the PUSCH, the UE may monitor the licensed band cell or the unlicensed band cell.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a user equipment (UE) in a communication network, the method comprising:
   receiving, from a base station, a physical downlink control channel (PDCCH) including downlink control information (DCI) in a subframe n−1 belonging to an unlicensed band burst which includes a plurality of subframes in an unlicensed band;

decoding the DCI using a common radio network temporary identifier (RNTI); and identifying the number of symbols constituting a subframe n of the unlicensed band based on the decoded DCI which is received in the subframe n−1, wherein the DCI includes common control information for the unlicensed band, the common control information includes information on a location of the subframe n−1 used for transmitting the DCI within the unlicensed band burst and information indicating to whether or not the subframe n−1 is a partial subframe whose length is less than 1 millisecond, the common RNTI is used for receiving the DCI including the common control information, and n is an integer more than 1.

2. The method according to claim 1, wherein the common RNTI is obtained from the base station based on a radio resource control (RRC) signaling.

3. The method according to claim 1, wherein the common control information further includes information indicating a number of symbols occupied by a physical signal in the subframe n−1.

4. The method according to claim 1, wherein a length of the subframe n−1 is 1 millisecond and the subframe n is the partial subframe whose length is less than 1 millisecond.

5. The method according to claim 1, wherein, when consecutive subframes are received from the base station, the subframe n is a start subframe of the consecutive subframes.

6. The method according to claim 1, wherein, when consecutive subframes are received from the base station, the subframe n is an end subframe of the consecutive subframes.

7. The method according to claim 1, further comprising identifying to whether the subframe n is the partial subframe whose length is less than 1 millisecond based on the decoded DCI.

8. An operation method of a base station in a communication network, the method comprising:

generating downlink control information (DCI) including common control information for an unlicensed band;

scrambling a cyclic redundancy check (CRC) of the DCI using a common radio network temporary identifier (RNTI); and transmitting a physical downlink control channel (PDCCH) including the scrambled DCI to a user equipment (UE) in a subframe n−1 belonging to an unlicensed band burst which includes a plurality of subframes in the unlicensed band, wherein the common control information includes information indicating the number of symbols constituting a subframe n of the unlicensed band, information on a location of the subframe n−1 used for transmitting the DCI within the unlicensed band burst, and information indicating to whether or not the subframe n−1 is a partial subframe whose length is less than 1 millisecond, the common RNTI is used for transmitting the DCI, and n is an integer more than 1.

9. The method according to claim 8, wherein the common control information further includes information indicating a number of symbols occupied by a physical signal in the subframe n−1.

10. The method according to claim 8, wherein a length of the subframe n−1 is 1 millisecond and the subframe n is the partial subframe whose length is less than 1 millisecond.

11. The method according to claim 8, wherein, when consecutive subframes are transmitted to the UE, the subframe n is a start subframe of the consecutive subframes.

12. The method according to claim 8, wherein, when consecutive subframes are transmitted to the UE, the subframe n is an end subframe of the consecutive subframes.

13. The method according to claim 8, wherein the DCI further includes information indicating to whether the subframe n is the partial subframe whose length is less than 1 millisecond.

* * * * *